United States Patent [19]
Wynne et al.

[11] Patent Number: 5,520,968
[45] Date of Patent: May 28, 1996

[54] MULTILAYER SECOND-ORDER NONLINEAR OPTICAL FILMS OF HEAD-TO-HEAD, MAINCHAIN CHROMOPHORIC POLYMERS

[75] Inventors: Kenneth J. Wynne, Fairfax County, Va.; Geoffrey A. Lindsay, Ridgecrest, Calif.; James M. Hoover, Ridgecrest, Calif.; John Stenger-Smith, Ridgecrest, Calif.; Ronald A. Henry, deceased, late of Ridgecrest, Calif., by Ann H. Henry, legal representative; Andrew P. Chafin, Ridgecrest, Calif.

[73] Assignee: The United States of America as represented by the Secretary of the Navy, Washington, D.C.

[21] Appl. No.: 435,913

[22] Filed: May 5, 1995

[51] Int. Cl.⁶ .................................................... G02F 1/35
[52] U.S. Cl. .............................. 428/1; 359/326; 359/328; 428/333; 427/434.3
[58] Field of Search ..................... 359/326, 328; 428/1, 333; 427/434.3

[56] References Cited

U.S. PATENT DOCUMENTS

| 5,162,453 | 11/1992 | Hall et al. | 525/404 |
| 5,225,285 | 7/1993 | Hall et al. | 428/413 |
| 5,247,055 | 9/1993 | Stenger-Smith et al. | 528/310 |
| 5,247,602 | 9/1993 | Penner et al. | 385/122 |

*Primary Examiner*—Mark Nagumo
*Attorney, Agent, or Firm*—Thomas E. McDonald; William F. McCarthy

[57] ABSTRACT

Second-order nonlinear optical polymeric films, including alternating monomolecular layers of two head-to-head, mainchain, amphophilic, chromophoric polymers, one polymer having the electron donating end of the chromophore attached to hydrophilic groups, and the other polymer having the electron donating end of the chromophore attached to hydrophobic groups, and methods of fabricating the films for use in optonics.

15 Claims, 11 Drawing Sheets

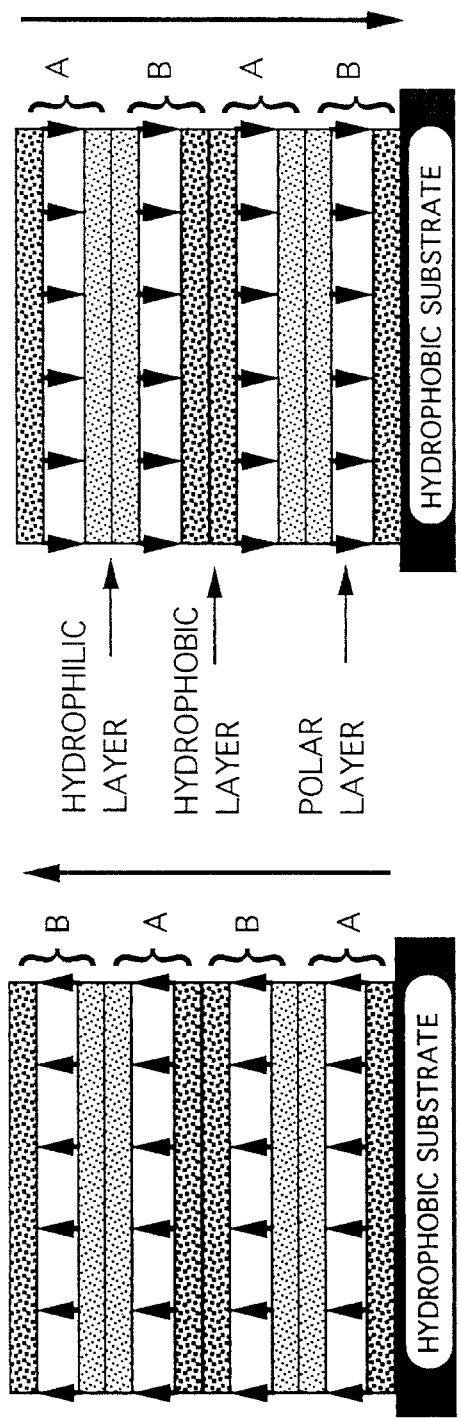
FIG. 3b
FIG. 3a
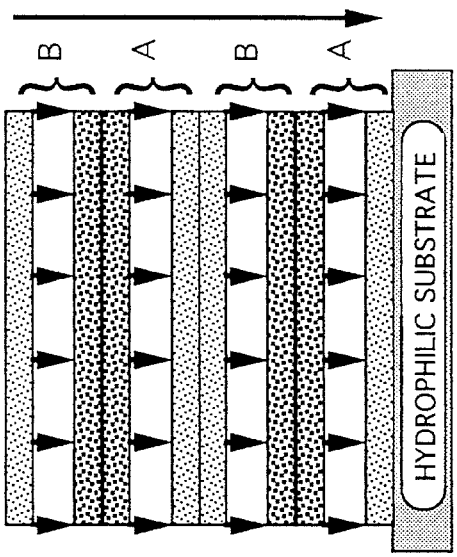
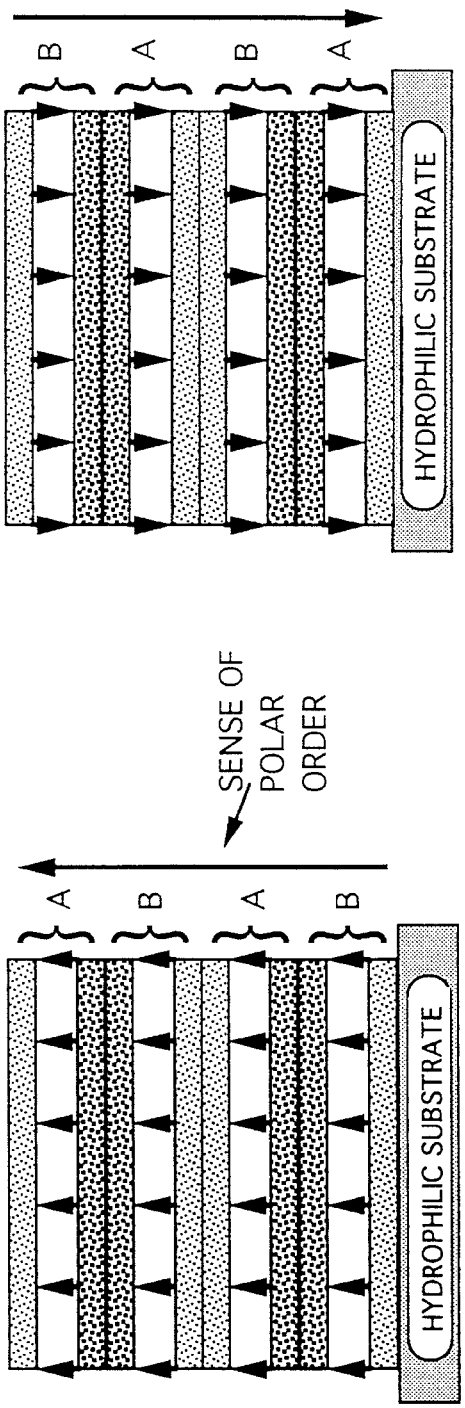
FIG. 3d
FIG. 3c

MULTILAYER SECOND-ORDER NONLINEAR OPTICAL FILMS OF HEAD-TO-HEAD, MAINCHAIN CHROMOPHORIC POLYMERS

TECHNICAL FIELD

The invention relates generally to second-order nonlinear optical (NLO) films, and, in particular, to multilayer NLO films of head-to-head, mainchain chromophoric polymers.

BACKGROUND INFORMATION

Polymeric thin films containing asymmetrical chromophores have been under investigation for their second-order nonlinear optical (NLO), piezoelectric, and/or pyroelectric properties for over ten years. This area of research has yielded several types of versatile polymers useful for applications such as optical second harmonic generation and electro-optic modulation of optical signals. The first generation organic NLO polymers (NLOPs) were comprised of small asymmetrical chromophores dissolved in glassy polymers (guest-host systems). The materials science has since evolved to sidechain and mainchain systems in which the asymmeteric chromophore is chemically attached to the polymer, as discussed in more detail below.

Optical nonlinearity

To a first approximation, it is the molecular structure of the chromophore and its orientation that dictate the nonlinear optical properties of the system, and it is the polymer structure that dictates the processability and temporal stability of the final product. Second-order nonlinear optical films do not have a center of symmetry. In order to understand the symmetry requirements, one must consider the three-dimensionality of the electric polarizability in the material, the directions of the applied electric fields, and the electric fields of light rays passing through the material. A treatment most often used to describe this interaction is the following nonlinear polarization equation (a power series in electric field strength, E:

$$P = \chi^{(1)}E + \chi^{(2)}EE + \chi^{(3)}EEE + \ldots$$

wherein P is the polarization in the material, $\chi^{(1)}$ is the coefficient for linear interaction with E, $\chi^{(2)}$ is the second-order nonlinear optical coefficient, and $\chi^{(3)}$ is the third-order nonlinear optical coefficient. The second-order nonlinear optical coefficient is a third-rank tensor whose tensor elements are all zero in materials possessing the center-of-inversion symmetry.

In order for organic films to have large second-order nonlinear optical coefficients, $\chi^{(2)}$, they must contain a high concentration of asymmetrical, highly hyperpolarizable chromophores, arranged in a highly polarized configuration. NLOP chromophores must have an inherently large molecular second-order nonlinearity, $\beta$ (also called second-order susceptibility, quadratic susceptibility, and first hyperpolarizability).

For predicting the magnitude of the first molecular hyperpolarizability coefficient beta ($\beta$), to a first approximation, considering only the ground state of the chromophore and the first excited singlet state leads to a very successful two-state model. The most important requirement for a large beta is that the asymmetrical chromophore has a low energy of transition between ground and first excited singlet state. It is also necessary that there be a large change in dipole moment in going between the ground state to the first excited singlet state, and that the transition dipole moment be large. In general, large II-conjugated links (e.g., vinylenes, phenylenes, thienylenes, etc.) connecting properly balanced electron donor and acceptor groups are desirable. In this disclosure, "NLOP" is used only in reference to polymers that can be formed into films that exhibit significant second-order optical nonlinearity, that is, the NLOP $\chi^{(2)}$ is at least three times greater than the $\chi^{(2)}$ of quartz which is about 1.0 pm/V.

The following mathematical treatment can be applied to an isolated chromophore's dipole moment: $\mu = \mu_o + \alpha E + \beta EE + \ldots$, where $\mu$ is the dipole moment upon applying the electric field E, $\mu_o$ is the ground state dipole moment, $\beta$ is a third rank tensor describing the chromophore's second order susceptibility, which is also called the quadratic hyperpolarizability or first hyperpolarizability.

Guest-Host NLOP

The simplest form of nonlinear optical polymer, called guest-host (G-H) systems, are solid solutions of small chromophoric molecules and high molecular weight polymers. Generally the G-H system contains about 10 to 20% by weight of the chromophore (higher levels tend to phase separate or have lower glass transition temperatures due to plasticization). The chromophores in G-H systems are somewhat labile (they diffuse by translation and rotation) and they evaporate or sublime at elevated temperatures. Small chromophores, which are easily absorbed through the skin, can be toxic, mutagenic, teratogenic, and carcinogenic. High molecular weight polymers cannot be absorbed through the skin. Therefore, by attaching the chromophore to the polymer, the lability and toxicity problems are solved.

Sidechain NLOP

Sidechain (SC) polymers are comprised of assymetric chromophores which are chemically linked or tethered to the backbone at one end of the chromophore, e.g., at the electron accepting end or at the electron donating end, and the majority of the chromophore is pendent to the backbone. Most of the early reported SC polymers were derived from the free radical copolymerization of (meth) acrylic functional chromophores and methyl methacrylate. Some SC polymers have been designed for Langmuir-Blodgett deposition, e.g., the polymers described in U.S. Pat. No. 5,162,453, issued Nov. 10, 1992 to Hall et al, and U.S. Pat. No. 5,225,285, issued Jul. 6, 1993 to the same inventors, which are described below and incorporated herein by reference.

Mainchain NLOP

Mainchain (MC) polymers are comprised of asymmetrical chromophores which are linked in the backbone at both ends of the chromophore, and the majority of the chromophore forms part of the backbone, the rest of the backbone being connecting groups, bridging one chromophore to the next. The asymmetrical chromophores can be linked in a head-to-tail configuration (isoregic), in a head-to-head configuration (syndioregic), or randomly head-to-tail and head-to-head (aregic). The mainchain chromophoric topology is inherently more stable than the sidechain topology because the chromophore has one less degree of freedom of motion.

Stability

Geometric considerations, such as how to orient the asymmetrical chromophore in a polar alignment, how to increase the glass transition temperature of the NLOP, and how to prevent relaxation of the chromophore in NLOPs are of utmost importance for improving long term optical stability. There are two types of stability. Physical stability refers to stability of alignment of the chromophore. Chemical stability refers to the integrity of the original chemical structure of the chromophore. Chemical changes can be brought about by thermal energy, electromagnetic energy (photons), reactions with oxygen or other chemicals, or any combination of the above. Chemical changes can range from isomerization (cis—trans), to cyclization, to oxidation, to bond cleavage, or to free radical additions, all of which change the refractive index and $\chi^{(2)}$ properties. The temporal stability of a $\chi^{(2)}$ NLOP polymer film refers to how well the physical stability(alignment) and chemical stability of the chromophores are maintained at a given temperature. The processing stability refers to how well the polymer holds up under film processing and packaging conditions.

In order to mass produce low cost integrated devices, reliable thin film processing techniques are necessary for integration with silicon chip manufacturing. If these polymers can be easily processed, their uniquely low dielectric constant and large second-order nonlinear optical coefficient ($\chi^{(2)}$) will ensure their strong competition for high speed optical signal processing applications. Several processes for giving polar order to the chromophores in a polymer film exist. These include electric-field poling and self-assembly techniques, such as Langmuir-Blodgett (LB) processing.

Electric-Field Poling

Thin films of the polymer are prepared for poling by spin-coating a liquid solution containing about 10% of the polymer onto a solid substrate. The solvent is removed by baking the film just above the glass transition temperature ($T_g$). An electric field is applied across the film by corona poling the film as it sits on a grounded conductor plane, or by charging two electrodes contacting the film. There may also be thin cladding or buffer layers between the electrodes and the nonlinear optical polymer. The films are typically poled at a field strength of about 50 to several hundred volts per micron. The electric field is applied at or above $T_g$ for 10 to 60 minutes, then the film is cooled with the field on. After the external field is removed, a net alignment of dipole moments can remain essentially locked in the film for years as long as the temperature of the film remains well below any solid state transition, such as the $T_g$. This imparts noncentrosymmetry to the film which is necessary for its second-order nonlinear optical properties.

There are major problems with electric-field poling. The polymer must be heated to quite high temperatures at which the Brownian motion and rotation of the molecules works against the torque exerted by the electric field on the dipole moment of the chromophores. Hence, at higher temperatures, the chromophores will be less well ordered (i.e., the degree of order $\approx \mu E/kT$, where $\mu$ is the ground state dipole moment of the chromophore, E is the applied electric field, k is Boltzmann's constant, and T is the temperature). Polymers containing formal charges are difficult to pole with an electric field because the charges tend to migrate through the polymer and short-out the electrode. It is difficult to have layers with opposed orientations of the chromophores within the same polymer film as is sometimes desirable for phase matching in frequency doubling applications.

When chromophores in a molten polymer film are exposed to an electric field, the torque of the applied field on the dipoles of the chromophores aligns the average direction of their ground state dipole moments parallel to the direction of the applied field. The largest component of the $\beta$ tensor of a chromophore is usually at some angle away from the direction of the ground state dipole moment of the chromophore, but "goes along for the ride" and becomes aligned (on the average) as the dipoles are aligning with the electric field. $\chi^{(2)}$ is a tensor quantity describing the second-order nonlinear optical properties of the film, and is a result of the sum of the $\beta$ tensors of the individual chromophores. Hence, for electric-field-poled films, the $\chi^{(2)}$ tensor has conical symmetry around the direction of the applied electric field. Thus, the largest component of the $\chi^{(2)}$ tensor (e.g., $d_{33}$ for corona poling) results from those parts of the largest components of the $\beta$ tensors that are projected onto the direction of the applied electric field. Estimates of $\beta$ from molecular orbital calculations, combined with estimates of the conical angle about the poling direction from birefringence measurements, have resulted in reasonably accurate $d_{33}$ predictions.

Langmuir-Blodgett (LB) Processing

To make films by LB processing, an organic compound is floated on a liquid, usually water, in a trough which holds the water. A solid substrate is dipped through the air-water interface depositing on the substrate a single molecular layer. Thicker films comprised of multilayers of polymer are built up by dipping the substrate repeatedly into and/or out of the LB trough, depositing one molecular layer per stroke. Turn-key, computer-automated, multi-compartment troughs are available from many commercial suppliers, such as NIMA (Coventry CV4 7EZ, England), NLE (Nagoya, 468, Japan), and KSV (SF-00380 Helsinki, Finland).

In LB processing, the polymer molecules are designed to have hydrophilic and hydrophobic groups which cause the polymer to float in one conformation on the water. These hydrophilic/hydrophobic forces are useful for removing the centrosymmetry by orienting the asymmetrical chromophores with respect to the plane of the film.

Multilayer LB films can be formed in three different configurations. Historically these are called "X"-, "Y"- and "Z"-type films, where X is made by depositing always on the down-stroke, Z is made by depositing always on the up-stroke, and Y is made by alternating up- and down-strokes. For the case in which the large dipole moment of the chromophore is normal to the plane of the substrate, all-up or all-down films will be polarized, and the up-down films will not be polarized (dipoles in adjacent layers cancel out). However, in Y-type deposition, sometimes the chromophores will align in a herring-bone pattern due to shear forces in the dipping direction caused by pulling and pushing the substrate through the film floating on the water or by local packing considerations. The herring-bone pattern results in a net polarization in the plane of the film, and can be detected by the generation of second harmonic light. The Y configuration is thermodynamically more stable (e.g., sometimes X and Z configurations spontaneously rearrange in the solid state to the Y configuration). Another way to make polar films by Y-type deposition is to alternately interleave asymmetrical chromophoric polymer layers with optically inert polymer layers. Or one may use a two-compartment LB trough, building up bilayers in which the two polymers are configured with the charge transfer axis of their chromophores respectively pointing in the opposite sense with regard to the hydrophilic and hydrophobic parts of the polymer to which they are attached.

Molecular weight (and its distribution) is one of several key parameters which affect the physical behavior of polymer molecules in monolayer films at the air-water interface (Langmuir films). The modulus and viscosity of Langmuir films under surface compression vary greatly with molecular weight.

LB processing has the advantage over electric-field poling in that it can be done at room temperature (or lower); hence, the kT Brownian motion is much less. Furthermore, formal ionic charges on the polymer will not hinder the ordering process; in fact, they can be taken advantage of in designing hydrophilicity into the polymer. This film processing procedure has been reduced to practice for sidechain polymers, but not for mainchain chromophoric polymers. However, mainchain polymers are inherently more stable than sidechain polymers because both ends of the chromophore are attached to the backbone of the polymer, whereas only one end of the chromophore is attached to the backbone in a sidechain polymer, and the other end is dangling free at one of the interfaces of each monolayer. Furthermore, only mainchain polymers that contain the asymmetrical chromophore in a head-to-head (syndioregic) configuration can have the chromophore disposed in a polar alignment normal to the plane of the film by hydrophilic/hydrophobic forces. This is because a mainchain polymer containing chromophores in a head-to-tail configuration will have its chromophores lying on the water, in the plane of the film, and the chains can be pointing in opposite directions. The utility of the syndoregic configuration for L.B. processing will become clear in the detailed description of the invention below.

U.S. Pat. No. 5,162,453, issued Nov. 10, 1992 to Hall et al, and U.S. Pat. No. 5,225,285, issued Jul. 6, 1993 to the same inventors, describe a multilayered polarized film $(AB)_n$, fabricated by the Langmuir-Blodgett technique, in the Y-type configuration, comprising n number of bilayers AB. Each bilayer AB consists of a first layer of a sidechain chromophoric polymer A having the electron accepting end of the sidechain chromophore attached to the polymer backbone, and a second layer of another sidechain chromophoric polymer B having the electron donating end of the chromophore attached to the polymer backbone.

U.S. Pat. No. 5,247,055, issued Sep. 21, 1993 to Stenger-Smith et al, and incorporated herein by reference, describes new syndioregic chromophoric polymers, their self assembly on a surface, and electric field poling to achieve polar films exhibiting second-order nonlinear optical properties. U.S. Pat. No. 5,247,055 teaches the use of a single polymer for all layers. This patent also teaches that when monolayers are built up, one upon the next, by the X or Z types of LB deposition processes, one monolayer may be chemically cross-linked to the next monolayer. For example, carboxyl groups in one monolayer may react with epoxy groups in the next monolayer. Although not discussed in the patent, such chemical cross-linking of adjacent monolayers may override the thermal instability of identical polymer layers due to adjacent hydrophobic/hydrophilic domains and keep their dipole moments pointing in the same direction.

For films that are processed by LB or other techniques that align the chromophores by hydrophobic-hydrophilic interactions, the dipole moment of the chromophore has little influence on the actual aligning process (admittedly, dipole-dipole repulsion may have a secondary effect on alignment if the polymer is improperly designed). The largest component of the β tensor generally lies along the long axis of the chromophore, which is also the charge transfer axis of the chromophore. The hydrophilic and hydrophobic groups that force alignment of the asymmetrical chromophore at an interface are positioned at the extreme ends of the long axis of the chromophore. The average direction of alignment of the long axes of the chromophores can be assumed to lie nearly perpendicular to the film surface if hydrophilic-hydrophobic forces are the only forces important to the alignment of the chromophores. However, in LB processing of polymers, there is usually an additional ordering force due to the shearing of the polymer chains as they are pulled from the air-water interface—the polymer backbones tend to align in the dipping direction. In this case, there may also be a preferred azimuthal angle of alignment of the chromophores. The average alignment of the chromophores can be estimated from 3-dimensional birefringence measurements (e.g., from polarized UV-VIS absorption due to the charge transfer oscillation in the chromophore, or from polarized second-harmonic generation measurements).

The dipoles of the chromophores do become aligned during LB processing (i.e., they "go along for the ride"). Therefore, one can still refer to these films as having "polar order." For the sake of brevity and convenience, in this patent application, the alignment of chromophores in the films will be referred to as imparting "polar order" to the films, terminology often found in the literature. As we are interested in the second-order nonlinear optical properties of the films, it will be understood that referring to their "polar order" also implies (because of the design of the accordion polymer) that the $\chi^{(2)}$ tensor of the film is relatively large.

SUMMARY OF THE INVENTION

One object of this invention is to provide water-insoluble, second-order nonlinear optical films comprised of head-to-head, mainchain chromophoric polymers which are fabricated by the Langmuir-Blodgett technique, said films being useful for high speed optical signal processing applications, such as electro-optic switching and frequency doubling. For LB processing, special bridging groups of the chromophoric polymers were found to facilitate alignment on a LB trough.

It is another object of the invention to provide designs that bring together thermodynamically stable, hydrophilic-hydrophilic and hydrophobic-hydrophobic interfaces of two different polymers (monolayers) to yield a repeating bilayer structure which guarantees a noncentrosymmetric film. The polymer chain structures which give the desired characteristics are shown schematically in the model bilayer in FIGS. 1 and 2.

These $-(AB)_n-$ multilayer films are fabricated from two polymers, one (polymer A) with its chromophore's electron accepting end connected to a relatively more hydrophilic bridging unit, and its chromophore's electron donating end connected to a relatively more hydrophobic bridging unit; and the other (polymer B) with its chromophore's electron accepting end connected to a relatively more hydrophobic bridging unit, and its chromophore's electron donating end connected to a relatively more hydrophilic bridging unit. As described above, these two polymers are deposited to give n bilayers on a solid substrate by the alternating, Y-type Langmuir-Blodgett process. The number of bilayers n may range from 1 upwards to 1000 or greater, though typically in the range of 50 to 300. A schematic of a general multilayer structure, which is comprised of multiple bilayers is shown in FIG. 3. "Relatively more hydrophobic", and "relatively more hydrophilic" refer to a comparison between the two bridging groups used to link the chromophores together in the mainchain of a polymer. As long as one bridging group is more hydrophilic and less hydrophobic than the other bridging group, the polymer will align at the air-water interface in the desired conformation.

BRIEF DESCRIPTION OF THE DRAWINGS

Further features and advantages of the invention will become apparent from the following detailed description of preferred embodiments, taken in conjunction with the drawings, in which:

FIGS. 3a, 3b, 3c, and 3d are schematic representations, similar to that of FIG. 2, showing the four arrangements of two bilayers AB, disposed on either a hydrophilic or hydrophobic substrate, in which the polarities, i.e., charge transfer dipole orientation, of all chromophores point in the same direction;

DETAILED DESCRIPTION OF THE PREFERRED EMBODIMENTS

Figure 1:
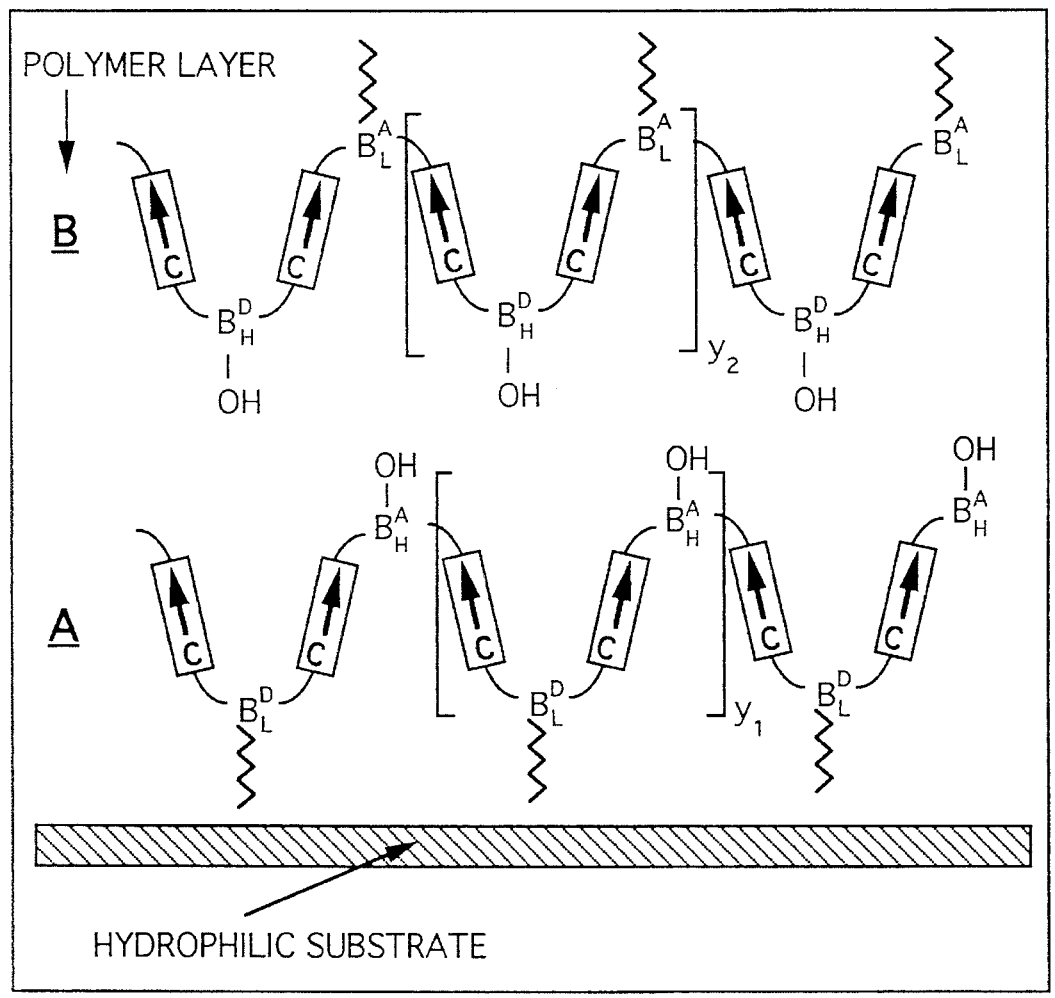
FIG. 1 is a schematic representation of a bilayer AB of two monomolecular layers of complementary, water-insoluble, head-to-head, mainchain, amphophilic, chromophoric polymers A and B, according to the invention, disposed upon a hydrophilic substrate.

Each second-order nonlinear optical film, according to the invention, comprises at least one bilayer of two monomolecular layers of water-insoluble, head-to-head, mainchain, amphophilic, chromophoric polymers, one monomolecular layer A being formed of a polymer A and the other monomolecular layer B being formed of a polymer B, polymers A and B independently having two or more sequences of bridged chromophore units having the formulas

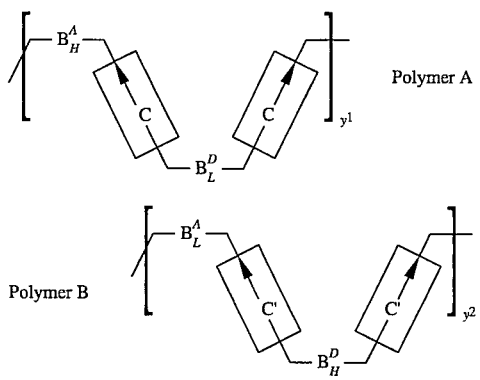

in which:

C and C' are chromophores of polymers A and B, respectively, wherein each chromophore has an electron accepting end represented by an arrow head, an electron donating end represented by an arrow tail, and a rigid connecting group which contains delocalized n-electrons and which is connected between the electron accepting end and the electron donating end of the chromophore;

$B_L^A$ is a hydrophobic (lipophilic) bridging group, extending between and attached to the electron accepting ends of two C' chromophores;

$B_L^D$ is a hydrophobic (lipophilic) bridging group, extending between and attached to the electron donating ends of two C chromophores;

$B_H^A$ is a hydrophilic bridging group, extending between and attached to the electron accepting ends of two C chromophores;

$B_H^D$ is a hydrophilic bridging group, extending between and attached to the electron donating ends of two C' chromophores; and y1 and y2 are degrees of polymerization of polymers A and B, respectively, which independently range from a minimum value of 2 to a maximum value greater than 300.

Preferably, each hydrophobic electron-accepting bridging group $B_L^A$ is selected from one of the following units:

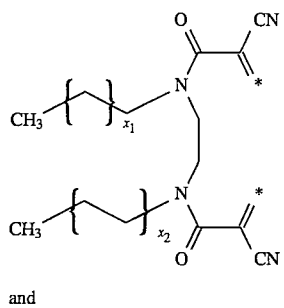

and

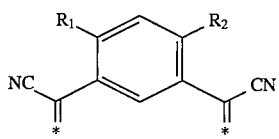

and

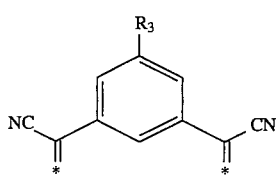

wherein:

\* designates bonds of attachment between the bridging group and a chromophore;

$x_1$ is an integer from 3 through 22;

$x_2$ is an integer from 3 through 22;

$R_1$ and $R_2$ are independently chosen from H, $CH_3$, and $CF_3$; and

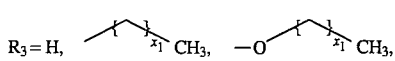
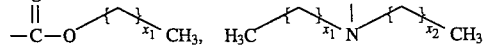

Preferably, each hydrophobic electron-donating bridging group $B_L^D$ is selected from one of the following units:

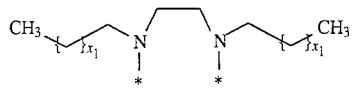

and

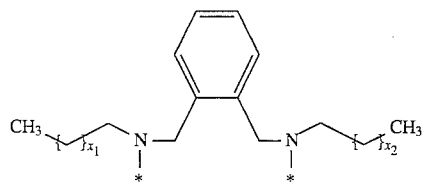

wherein:
* designates bonds of attachment between the bridging group and a chromophore;
$x_1$ is an integer from 3 to 22; and
$x_2$ is an integer from 3 to 22.

Preferably, each hydrophilic electron-accepting bridging group $B_H^A$ is selected from one of the following units:

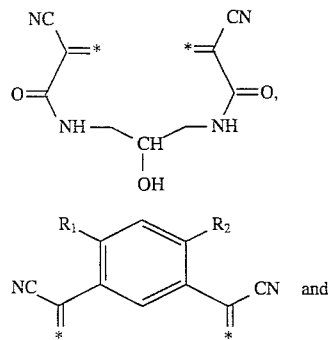

wherein:
* designates bonds of attachment between the bridging group and a chromophore;
$R_1$ and $R_2$ are independently chosen from —$NO_2$, —CN, and —$CONH_2$; and
$R_3$ is chosen from —OH, —$NH_2$, —$CO_2H$, —$CO_2CH_3$, —$CONH_2$, —$OCH_3$, —CN, and —$NO_2$.

Each hydrophilic electron-donating bridging group $B_H^D$ is preferably selected from one of the following units:

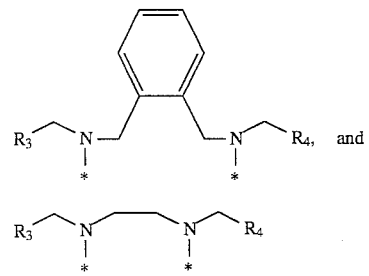

wherein:
* designates bonds of attachment between the bridging group and a chromophore; and
$R_3$ and $R_4$ are one of —$CH_2OH$, —$CO_2CH_3$, —$CONH_2$, —$CON(CH_3)_2$, —$CH_2CO_2CH_3$, —$CH_2CONH_2$, —$CH_2CON(CH_3)_2$, —$CH_2NH_2$, and —$CH_2CO_2H$.

At least one of (1) the rigid connecting group of the chromophore C and (2) the rigid connecting group of the chromophore C', is selected from the following groups, in which Z is S, O, or NH:

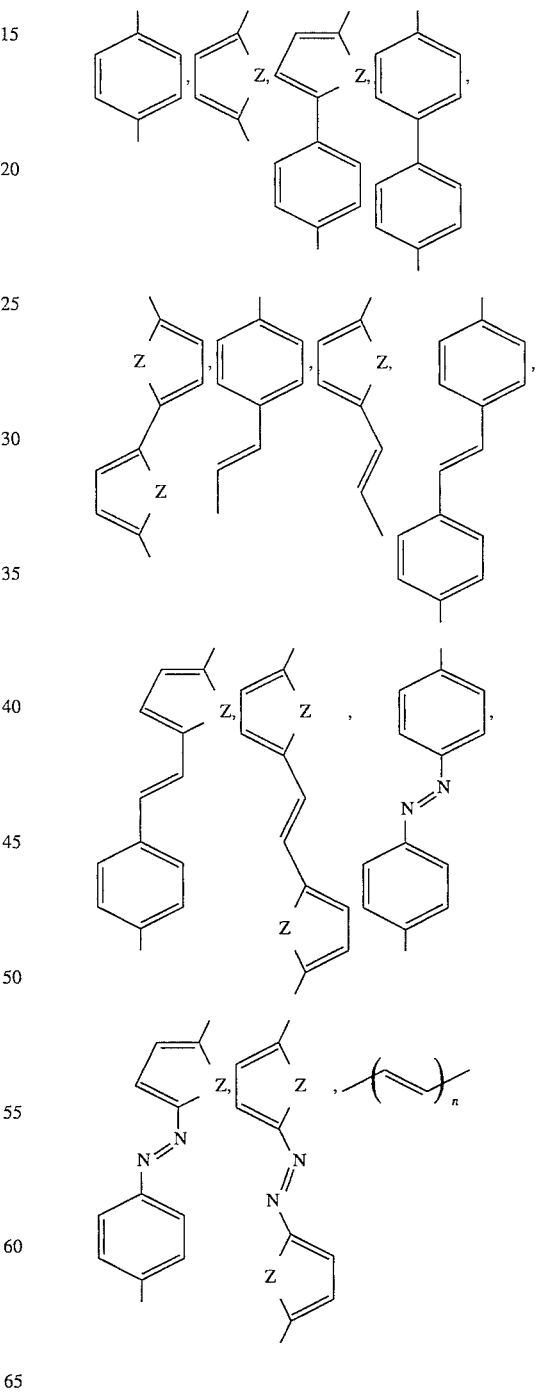

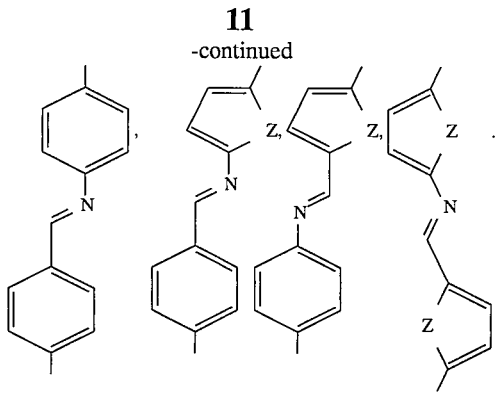

The second-order nonlinear optical films, according to the invention, are prepared from two syndioregic, mainchain chromophore polymers having amphophilic character, high chromophore density and high glass transition temperatures, by alternately depositing monolayer films (15–30 Å thick) using Langmuir-Blodgett technology to form thicker films. Numerous depositions can result in 0.5 to 1.0 μm-thick, noncentrosymmetric optical waveguides, having a net polarization and exhibiting $\chi^{(2)}$ properties. The NLO properties are characterized by measurement of the linear electro-optic effect, and second harmonic generation. These measurements are made as a function of the number of layers comprising the films.

The polymers of this invention, such as those described below and shown in FIG. 1, have their molecular dipole moments arranged in a syndioregic (head-to-head) architecture and have amphophilic character, i.e., have both hydrophilic and hydrophobic bridging groups connecting the chromophores. When the polymer chains are deposited and compressed at the air-water interface, the syndioregic and amphophilic characteristics allow the chains to fold and position the relatively hydrophilic bridging groups in the water and the relatively hydrophobic bridging groups in the air. In this arrangement, the molecular dipole moment of polymer A points toward the water, whereas the opposite obtains for polymer B.

Figure 2:
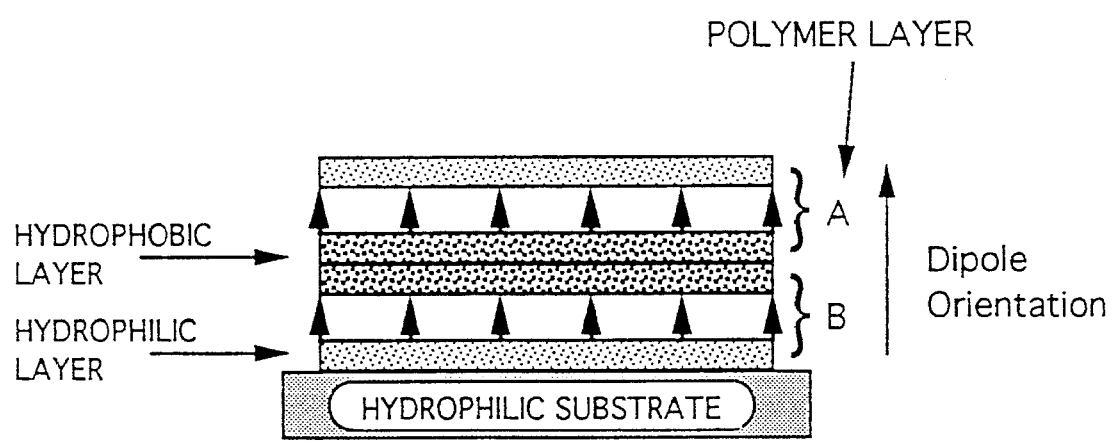
FIG. 2 is a more compact, simplified representation of the bilayer structure and substrate shown in FIG. 1.

FIG. 1 shows the general structure of polymer A and polymer B, and the structure of the AB bilayer. FIG. 2 shows a more compact representation of the same bilayer structure. In FIG. 1, $B_H$ is a moiety which is relatively hydrophilic (H=hydrophilic) and bridges two donor ($B_H^D$) or two acceptor ($B_H^A$) sites $B_L$ is a moiety which is relatively hydrophobic (L=liphophilic =hydrophobic) and bridges two donor ($B_L^D$) or two acceptor ($B_L^A$) sites. The sense of the dipole in the bilayer is the same in the two chains, and in this bilayer is oriented such that the donor-acceptor dipole ($\rightarrow$=dipole) is approximately perpendicular to the plane of the substrate and with the acceptor moiety (arrow head) further away from the substrate than the donor moiety (arrow tail).

In FIGS. 1 and 2, the arrows actually refer to the direction of the charge transfer dipoles of the asymmetrical chromophores C, C', which also happens to be the general direction of the largest component of the β tensor of each chromophore. For brevity and convenience, this direction in FIG. 2 is designated "dipole orientation".

In FIG. 2, polymers A and B are reduced to zones representing the dipole layer, the hydrophobic layer (which is comprised of the hydrophobic component of polymer A together with the hydrophobic component of polymer B) and the corresponding hydrophilic layer.

The bilayer structure of FIGS. 1 and 2 may also be described by the formula $S_H(\rightarrow)(BA)_{n1}$, in which $S_H$ represents the hydrophilic substrate, the arrow $\rightarrow$ represents the direction of polarity relative to the substrate, BA represents the composition of the bilayer (B closest to substrate, A, next), and n is the number of bilayers in the structure (n1=n=1 for the case shown).

As used herein, the descriptive terms "hydrophilic" and "hydrophobic" are relative, rather than absolute terms. Thus, the hydrophobic bridging group $B_L$ of either polymer A or polymer B is hydrophobic relative to the hydrophilic bridging group $B_H$ of the same polymer, and vice versa. Also, the hydrophilic substrate $S_H$ is usually at least as hydrophilic, relative to the hydrophobic bridging groups $B_L$ of the polymer layer adjacent the substrate, as the hydrophilic bridging groups $B_H$ of the same polymer layer, to assure self-assembly of the polymer on the substrate in the desired configuration. Similarly, a hydrophobic substrate $S_L$ should be at least as hydrophobic, relative to the hydrophilic bridging groups $B_H$ of the overlying polymer layer.

FIG. 3a shows a four layer film (two bilayers) in which polymer A was first deposited on a down-trip, polymer B was deposited on an up-trip, and the process was repeated. In FIGS. 3a, 3b, 3c, and 3d, the polymer layer structure is indicated by letters adjacent to the layer (A for polymer A, B for polymer B); the hydrophobic layer is a dark shade while the hydrophilic layer is a light shade; and the dipolar layer is indicated by arrows, which indicate the relative sense of the dipole in those layers.

Depending on the substrate and the dipping procedure, a large number of different multilayer structures may be obtained. As multiple layers are deposited utilizing Y-type deposition, the relatively hydrophilic surfaces of adjacent layers and the relatively hydrophobic surfaces of adjacent layers are touching as this is the most thermodynamically stable conformation.

In the case of Y-type (alternate) deposition of polymer A and polymer B, four different multilayer structures may be obtained. These four structures, for the case of two bilayers, are shown in FIGS. 3a–3d. FIG. 3a shows a two bilayer structure on a hydrophobic substrate wherein the first monolayer (polymer A) is deposited on the down-stroke, followed by the second monolayer (polymer B) deposited on the upstroke. This process is then repeated to achieve the desired film thickness. In the resulting multilayers shown in FIG. 3a, the sense of the dipole is oriented away from the substrate. The other three possibilities for deposition of two AB bilayers are shown in FIGS. 3b–3d. Depending on the substrate and the dipping sequence, the sense of the polar order may be generated pointing toward the substrate or away from the substrate.

If an inversion of dipole direction is required at some depth in the film, for example, to improve phase matching by maximizing the overlap integrals of fundamental and second harmonic for frequency conversion in a waveguide geometry, then one needs only to deposit one of the polymers twice in succession, then continue with an alternating pattern. In so doing, this procedure inverts all of the dipole moments through the rest of the thickness of the film. In this way, if required, the sense of the dipole moment may be changed any number of times. This reversal of polarity is illustrated below for the case of a single reversal of polarity:

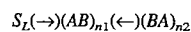

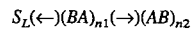

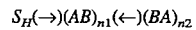

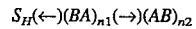

wherein $S_L$ is a hydrophobic (lipophilic) substrate, $S_H$ is a hydrophilic substrate,($\rightarrow$) indicates that the sense of polar order is in the direction away from the substrate, and (←) indicates that the sense of polar order is in the direction toward the substrate. In this representation n1 and n2 may independently range from 1 upwards to 1000 or greater, though preferably in the range of 50 to 300.

The reversal of polarity is illustrated below for the case of two changes in polarity using the terminology described above:

$$S_L(\rightarrow)(AB)_{n1}(\leftarrow)(BA)_{n2}(\rightarrow)(AB)_{n3}$$

$$S_L(\leftarrow)(BA)_{n1}(\rightarrow)(AB)_{n2}(\leftarrow)(BA)_{n3}$$

$$S_H(\rightarrow)(AB)_{n1}(\leftarrow)(BA)_{n2}(\rightarrow)(AB)_{n3}$$

$$S_H(\leftarrow)(BA)_{n1}(\rightarrow)(AB)_{n2}(\leftarrow)(BA)_{n3}$$

In this representation n1, n2, and n3 may independently range from 1 upwards to 1000 or greater, though preferably in the range of 50 to 300.

Figure 4:
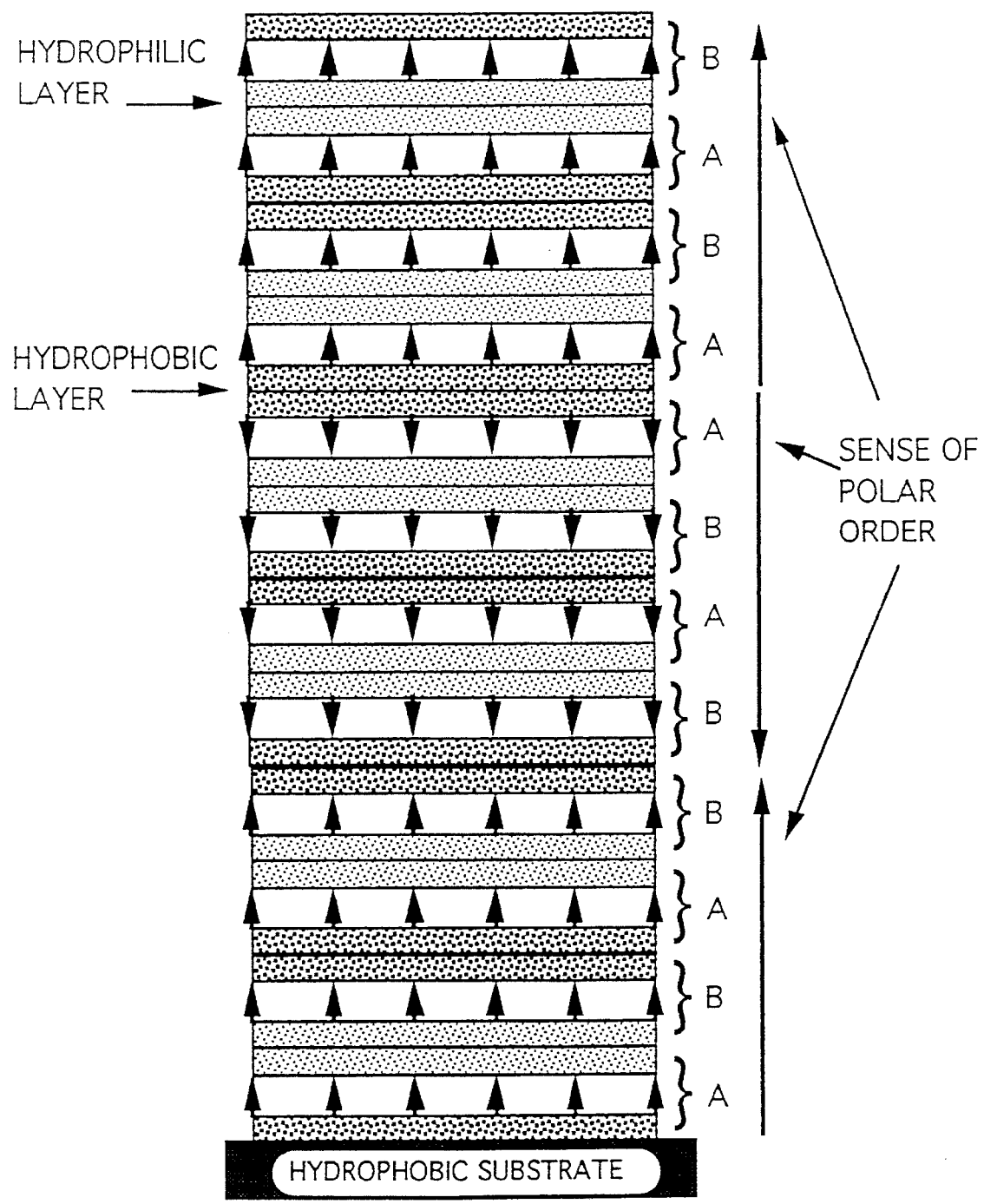
FIG. 4 is a schematic representation of six bilayers AB disposed on a hydrophobic substrate, in which the polarity of the chromophores reverses after every pair of bilayers.

A specific example of a film with polarity reversal is depicted in FIG. 4, which shows a multilayer designated $S_L(\rightarrow)(AB)_2(\leftarrow)(BA)_2(\rightarrow)(AB)_2$. In this example, the sense of the polar order is changed (by the presence of the (BB) layer) from toward the air to toward the substrate. The sense of the polar order is changed back to the original sense, away from the substrate by the presence of the (AA) layer.

A "neutral" or "zero" (i. e. centrosymmetric) "gap" layer or multilayer may be introduced at any position in the film. This centrosymmetric gap layer or multilayer may include a fatty acid, a fatty acid salt, or a polymer.

SIGNIFICANT RESULTS

Figure 5:
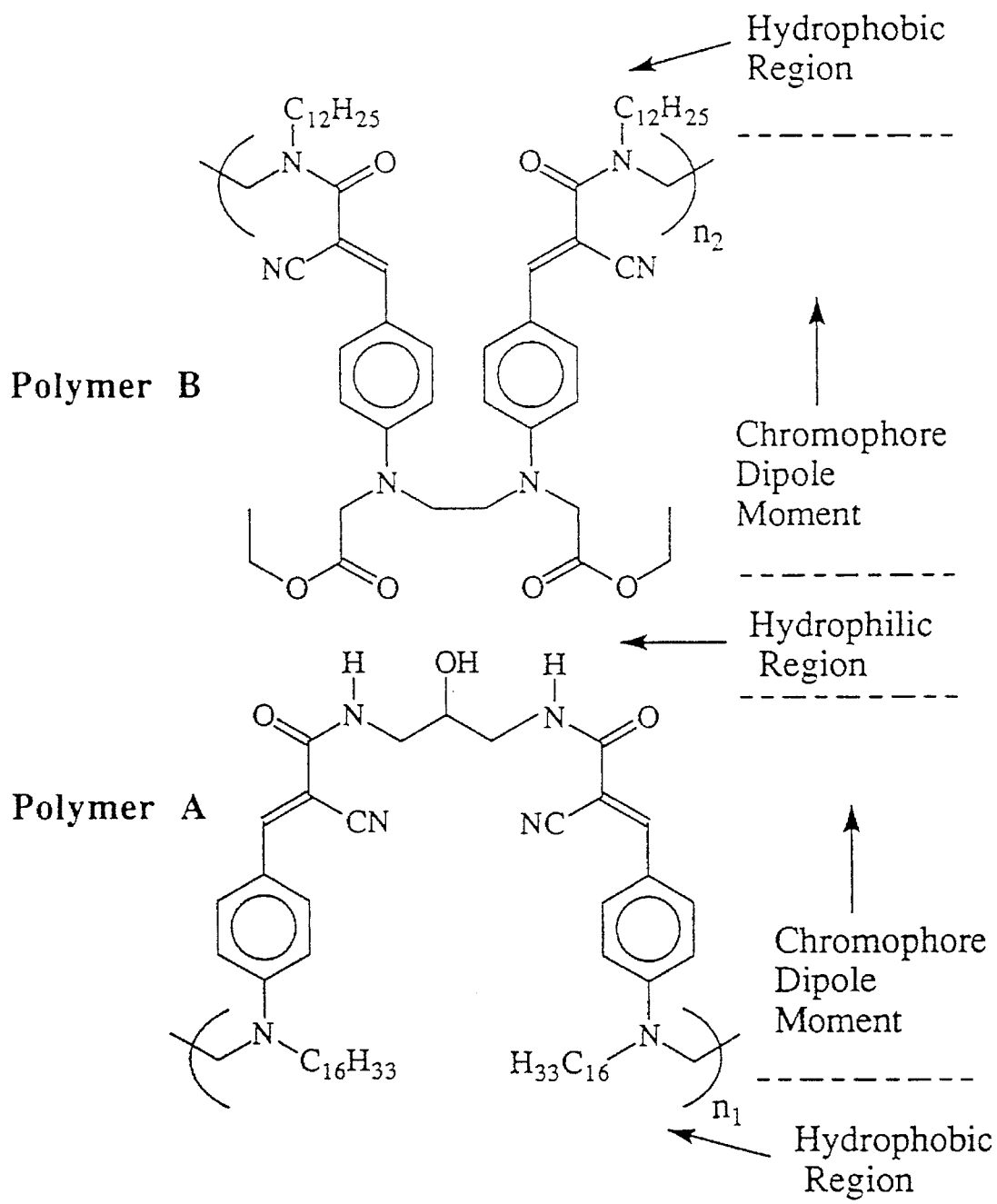
FIG. 5 is a scheme showing the chemical structures of two complementary, chromophoric, amphophilic polymers (A, B) based on the α-cyanocinnamoyl chromophore.

To demonstrate that the concepts embodied in FIGS. 1, 2, and 3 are valid, two chromophoric, amphophilic, polymers based on the α-cyanocinnamoyl chromophore were synthesized: one polymer was hydrophilic on the electron accepting end of the chromophore (polymer A), and the other polymer was hydrophilic on the electron donating end of the chromophore (polymer B). The structures of these polymers are shown in FIG. 5.

The thermodynamically favored, noncentrosymmetric orientation of molecular dipoles has been experimentally confirmed in monolayers (Langmuir films) of both polymers, and in -(AB)$_n$- multilayer films, and is the basis for their nonlinear optical properties.

EXAMPLE 1

Synthesis of a hydrophobic precursor to polymer A

Figure 6:
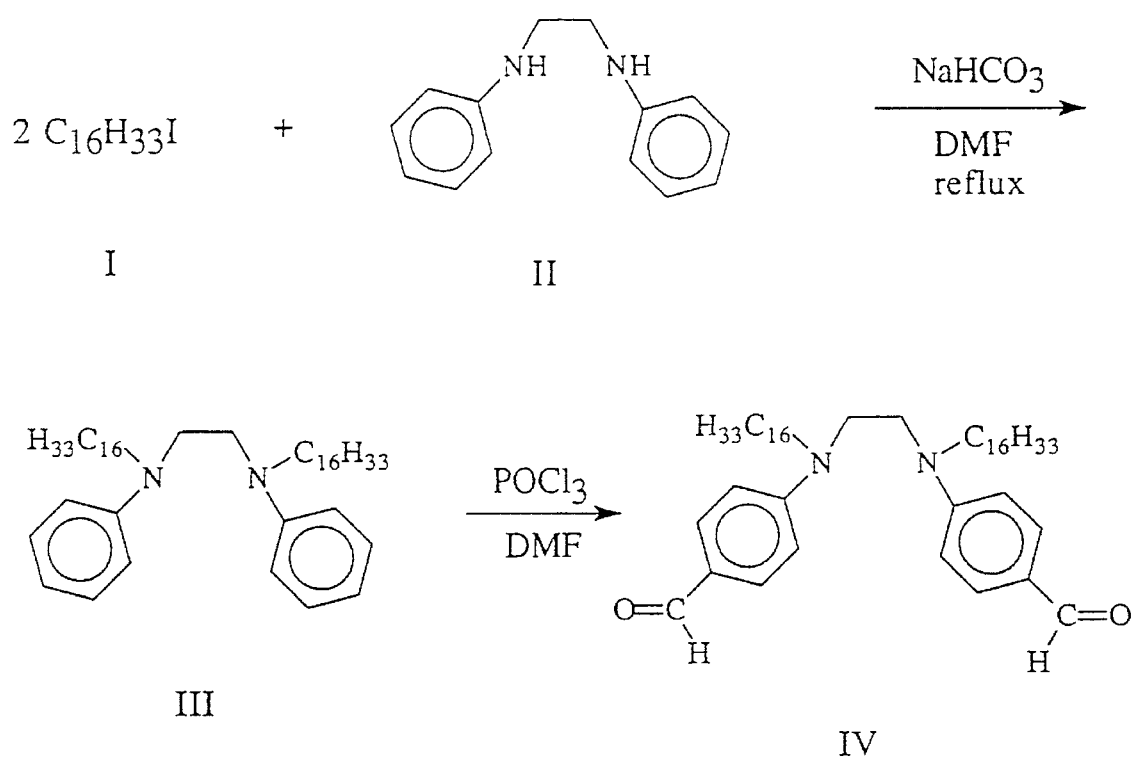
FIG. 6 is a scheme for the synthesis of a hydrophobic precursor to polymer A.

The synthetic route is shown in the scheme of FIG. 6. Mixing 1-iodohexadecane (I) with N,N'-diphenyl-ethylenediamine (II) produces compound III. A mixture of 59.2 g (0.168 mole) of cmpd. I and 17.0 g (0.08 mole) of cmpd. II was refluxed with NaHCO$_3$ in DMF for 42 hours. After cooling and pouring over an ice water/Na$_2$CO$_3$ mixture, the crude product III obtained was recrystallized from 2-propanol, mp 38°–46° C. Compound III is converted to the corresponding bisaldehyde IV by the Vilsmeier reaction. Vilsmeier conditions: 6.8 g of POCl$_3$ was added to 14 mL of cold, dry DMF. After stirring 2.5 hr. at 0° C., 6.3 g of cmpd. III was added and stirred for one hour at 25° C., 2 hours at 86°–93° C., then poured over ice and 15 g sodium acetate. After recrystallization from ethanol, felt-like masses of compound IV were recovered, mp 90°–93° C. Analysis: calculated C, 80.39; H, 11.24; N, 3.91. Found C, 80.68; H, 11.19; N, 3.93.

EXAMPLE 2

Synthesis of a hydrophilic precursor to polymer A

Figure 7:
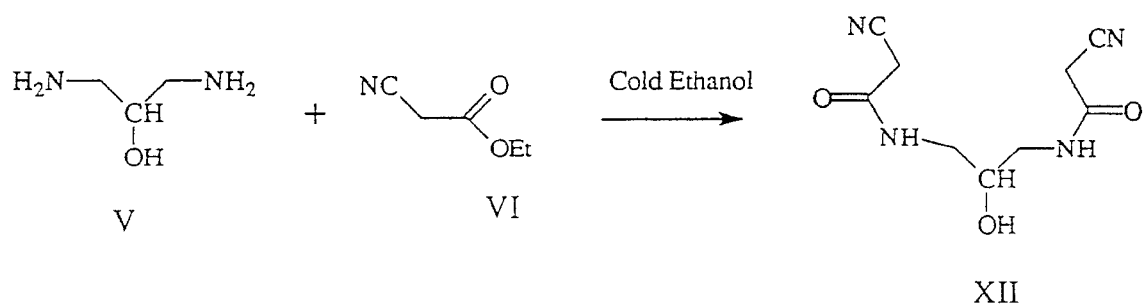
FIG. 7 is a scheme for the synthesis of a hydrophilic precursor to polymer A.

The synthetic route is shown in the scheme of FIG. 7. Condensing 1,3-diamino-2-hydroxypropane-(V) with ethyl cyanoacetate produces compound XII. A mixture of 22.99 g (0.204 mole) of ethyl cyanoacetate (VI) and 9.01 g (0.1 mole) of cmpd. V was added to 40 mL of cold abs. ethanol. After three days, the white cake of crystals was boiled with 450 mL of ethanol and filtered hot from 17.6 g of undissolved solid, mp 165°–166° C. Analysis: calculated C, 48.21; H, 5.40; N, 24.99; found C, 48.36; H, 5.48; N, 25.12.

EXAMPLE 3

Synthesis of polymer A (#1460-44)

Polymer A, shown in FIG. 5, was prepared by the step growth polymerization of a fatty bis-aldehyde monomer, with a hydrophilic bis-amide monomer. A mixture of 0.1207 g (0.17 mmole) of cmpd. IV from Example 1, and 0.0377 g (0.17 mmole) of cmpd. XII from Example 2, and 0.04 g (0.32 mmole) 4-dimethylaminopyridine was stirred in 7 mL of dry tetrahydrofuran (THF) and refluxed for 24 hrs. THF was evaporated, and the polymer was rinsed with hexanes, then dissolved in chloroform. A chloroform solution of the polymer was purified by preparative GPC (the cut above 25,000 molecular weight was used for analysis). The proton NMR spectrum indicated the desired structure was achieved. The molecular weight was about 35,000 using a polystyrene standard.

EXAMPLE 6

Figure 8:
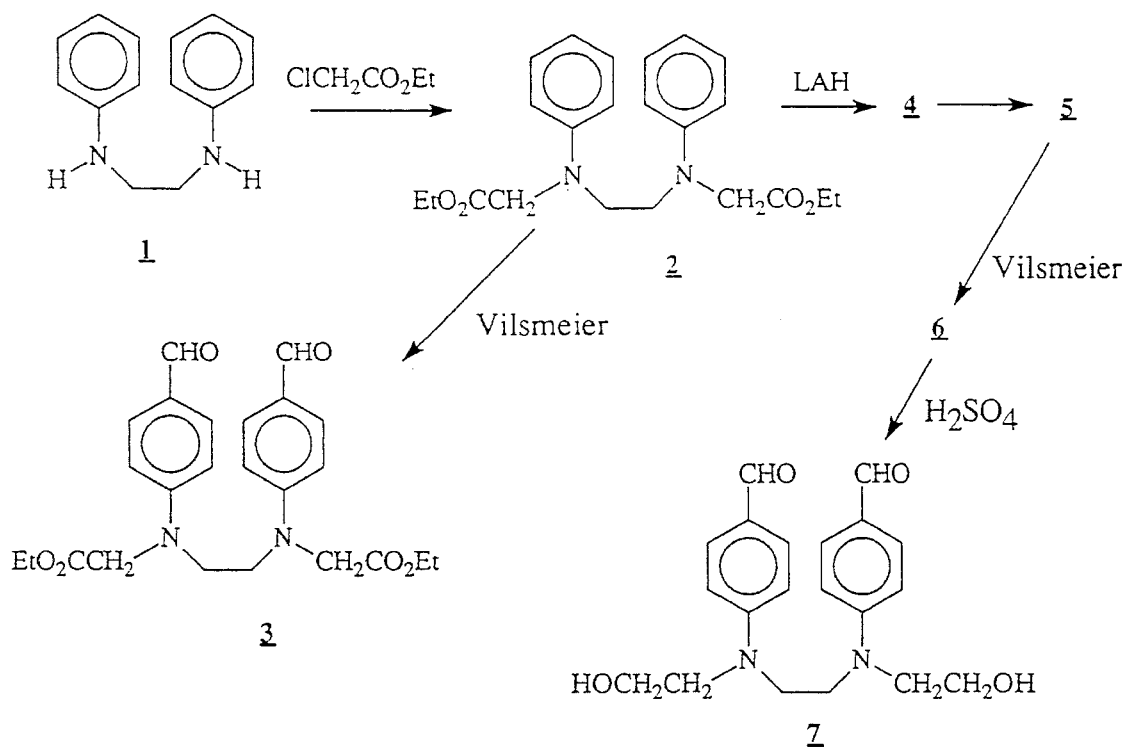
FIG. 8 is a scheme for the synthesis of hydrophilic precursors to B-type polymers.

Synthesis of hydrophilic precursor to polymer B (cmpd 2 in FIG. 8, N,N'-Biscarbethoxymethyl-N,N'-diphenyl-ethylenedamine)

A mixture of 8.1 g N,N'-diphenylethylenediamine (contaminated with N,N'-diphenyl-piperazine), 7 g sodium bicarbonate and 13.2 g ethylbromoacetate in 60 ml dry DMF was heated at reflux for 24 hrs. After cooling, the mixture was poured over 150 g of ice and water. The precipitated gum solidified and was washed with water, filtered, air dried and recrystallized from 130 ml absolute EtOH giving 2.9 g of off-white platelettes, m.p., 70°–80° C. A second recrystallization from absolute EtOH gave white platelettes, M. P. 86°–88° C.

EXAMPLE 7

Synthesis of hydrophilic precursor to polymer B (cmpd. 3 in FIG. 8)

To a mixture of 10 g dry DMF plus 16.8 g POCl$_3$ at 70° C. was slowly added with stirring 4 g of the N,N'-bis-carboethoxymethyl-N,N'-bis-anilinoethane (2). After the addition was complete, the mixture was then heated at 95° C. for 4 hrs. After cooling, the reaction was diluted with 50 ml of CHCl$_3$, which in turn was then added to a mixture of 250 ml of CHCl$_3$ plus 400 ml of water and stirred for 30 min. The layers were separated and the aqueous phase re-extracted with CHCl$_3$ (2×150 ml). The combined CHCl$_3$ extracts were washed with water (2×100 ml), dried (MgSO$_4$), filtered and evaporated at reduced pressure giving a yellow solid (3.27 g, 71% yield), m.p. 153-9. A small sample was recrystallized from ethanol yielding fine yellow crystals. m.p. 161.5°–2.5° C.

EXAMPLE 8

Synthesis of hydrophilic precursor to polymer B (cmpd. 4 in FIG. 8), N,N'-Bis-(2-hydroxyethyl)-dianilinoethane A stirred solution of 1.1 g of LAH (28 mmole) in 100 ml of $Et_2O$ was slowly added (20 min) to 3.15 g (8.2 mmole) of cmpd. 2 in 100 ml of $Et_2O$. After stirring at room temperature for three hours, there was slowly added 1 ml of $H_2O$ followed by 1 ml of 15% KOH and finally 3 ml of $H_2O$. After stirring for thirty minutes, ca. 5 g of $MgSO_4$ was added with stirring and the mixture was filtered and the white solid washed with $Et_2O$ (2×50 ml). The combined filtrates were evaporated at reduced pressure and the resulting solid recrystallized from ca. 40 ml of MeOH, giving 296 mg of N, N'-diphenylpiperazine, a contaminant. The filtrate was evaporated at reduced pressure and the resulting solid recrystallized from benzene/cyclohexane giving tan cubic crystals (2.13g; 99% yield based upon recovered diphenylpiperazine). Anal. Calcd for $C_{18}H_{24}N_2O_2$: C, 71.97; H, 8.06; N, 9.32. Found: C, 72.58; H, 8.18; N 9.28. $^1$H NMR (200 MHZ; DMSO-$d_6$): 7.14 (4H, m, AA'BB'C system, ArH), 6.69 (4H, m, AA'BB'C system, ArH), 6.52 (2H, m, AA'BB'C system, ArH), 4.69 (2H, br s, OH), 3.48 (8H, br s, $NCH_2CH_2N$ and $NCH_2CH_2OH$), 3.35 (4H, t, J=6.3 Hz, $NCH_2CH_2OH$).

EXAMPLE 9

Synthesis of hydrophilic precursor to polymer B (cmpd. 5 in FIG. 8), N,N'-Bis-(2-acetoxyethyl)-dianilinoethane A mixture of 2 g (6.67 mmole) of cmpd 4 . and 300 mg of pyridine in 5 ml of $Ac_2O$ was heated at ca. 95° C. for 1.5 hrs and then evaporated at reduced pressure. The residue (an oil) was dissolved in 100 ml of $CH_2Cl_2$ and extracted with water, dried ($MgSO_4$) and evaporated at reduced pressure giving 2.72 g of a yellow oil. The product was quickly chromatographed (silica gel/$CHCl_3$) and evaporation of solvent yielded a pale yellow oil (2.48g, 97% yield), which solidified to a white solid 5. M.p. 59.5°–60.5° C. Anal. Calcd for $C_{22}H_{28}N_2O_4$: C, 68.72; H, 7.34; N, 7.29. Found: C, 68.97; H, 7.41; N, 7.15. $^1$H NMR (200 MHZ, acetone-$d_6$): 7.19 (4H, m, AA'BB'C system, ArH), 6.83 (4H, m, AA'BB'C system, ArH), 6.64 (2H, m, AA'BB'C system, ArH), 4.19 (4H, t, J=6 Hz, —$CH_2O$), 3.64 (4H, t, J=6 Hz, $NCH_2CH_2O$), 3.63 (4H, s, $NCH_2CH_2N$), 1.96 (6H, s, $CH_3$).

EXAMPLE 10

Synthesis of hydrophilic precursor to polymer B (cmpd. 6 in FIG. 8)

A mixture of 5.9 g of dry DMF and 9.9 g of $POCl_3$ was heated to 70° and stirred for 10 min. To this mixture was added 2.42 g (6.3 mmole) of cmpd. 5 in 6 ml of 1,2-dichloroethane with stirring. The mixture was then heated to ca. 85° C. and stirred for 2 hrs. After cooling the reaction mix was poured into a mixture of 250 ml of $CHCl_3$ and 250 ml of water and then stirred for 2 hrs. The layers were separated and the aqueous layer extracted with $CHCl_3$ (2×200 ml), the organic fractions were combined, washed with water (3×100 ml), dried ($MgSO_4$) and evaporated at reduced pressure. The residue was chromatographed (silica gel/$CHCl_3$) giving a yellow oil, which slowly solidified. Recrystallization from MeOH/$H_2O$ gave tan cubic crystals 6 (1.74 g, 63% yield). M.p. 121.5°–2° C. Anal. Calcd for $C_{24}H_{28}N_2O_6$: C, 65.44, H, 6.41; N, 6.36. Found: C,65.26; H, 6.54; N,6.24. $^1$H NMR (200 MHZ, acetone-$d_6$): 9.74 (2H, s,CHO), 7.73 (4H, m, AA'BB'system, ArH), 6.96 (4H, m, AA'BB' system, ArH), 4.26 (4H, t, J=6 Hz, $NCH_2CH_2O$) , 3.87 (4H, s, $NCH_2CH_2N$) , 3 . 79 (4H, t, J=6 Hz, $NCH_2CH_2O$), 1.96 (6H, s, $CH_3$).

EXAMPLE 11

Synthesis of hydrophilic precursor to polymer B (cmpd. 7 in FIG. 8)

A mixture of 440 mg (1 mmole) of cmpd. 6, 40 drops of conc $H_2SO_4$ and 10 ml of $H_2O$ in 100 ml of $CH_3OH$ was heated at reflux for 4 hours. After cooling, a few pieces of ice and a few ml of water was added and the mixture was then cooled in an ice bath. The pale yellow solid that separated was filtered, washed with water and dried giving a pale yellow fine crystalline solid (282 mg, 64% yield). M.p. 204°–5° C. Repeated concentration of the filtrate and recooling yielded a second (46 mg) and third crop (39 mg) of product 7. A small sample of material was recrystallized from benzene/MeOH giving pale yellow crystals. M.p. 211°–212° C. Anal. Calcd. for $C_{20}H_{24}N_2O_4$: C, 67.39; H, 6.79; N, 7.86. Found: C, 66.8; H, 6.69; N 7.65. $^1$H NMR (200 MHz, DMSO-$d_6$): 9.66 (2H, s, CHO), 7.66 (4H, m, AA'BB' system, ArH), 6.84 (4H, m, AA'BB' system, ArH), 3.70 (4H, b s, $NCH_2CH_2N$), 3.51 (10H, m, $NCH_2CH_2OH$).

EXAMPLE 12

Figure 9:
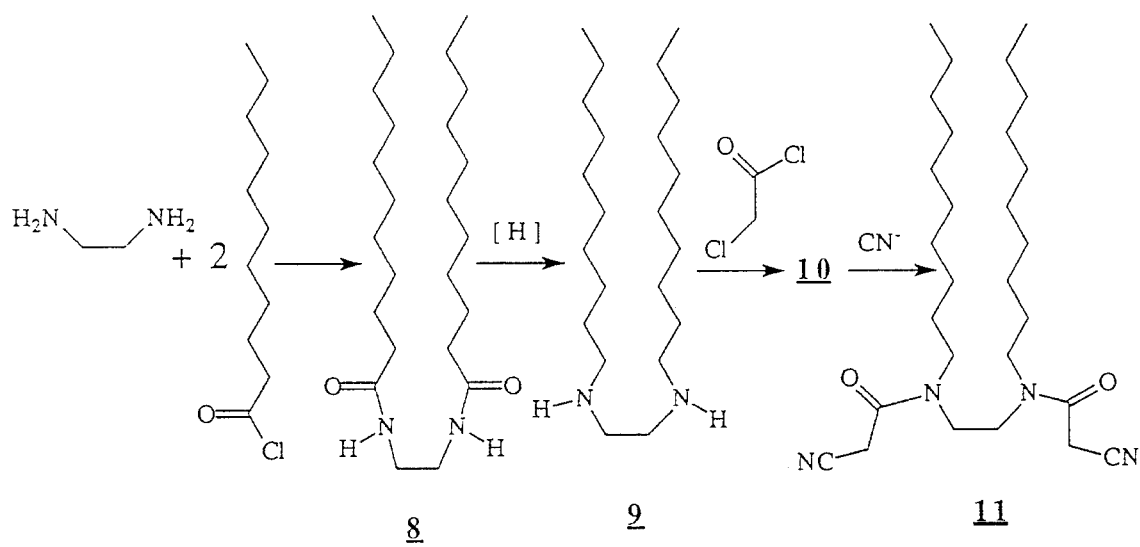
FIG. 9 is a scheme for the synthesis of hydrophobic precursors to B-type polymers.

Synthesis of a hydrophobic precursor to polymer B. ethylenediamine dilauramide (cmpd. 8 in the scheme of FIG. 9)

28 mL of Lauroyl chloride (120 mmoles) was added dropwise to a solution of 4 mL of ethylenediamine (60 mmoles) in 250 mL of pyridine, over 15 min. The mixture was heated to 100° C. then allowed to cool overnight. 400 mL Hexanes were added and the solids filtered off and washed with hexanes. After drying, the solids were stirred for 10 min with 200 mL of 4N HCl. The solids were then filtered off and dried in vacuo to give 17.86 g (70%) of a white powder, 8. This can be recrystallized from 400 mL of 1:1 ethanol/toluene to give 17.16 g of a white powder. $^1$H NMR (DMSO, 90° C.) 3.12 (4H, t), 2.05 (4H, t), 1.50 (4H, t), 1.26 (36H, m), 0.87 (6H, t). IR (cm$^{-1}$) 2910 (s), 1655 (s) , 1570 (s) .

EXAMPLE 13

Synthesis of a hydrophobic precursor to polymer B, N,N'-bisdodecylethylenediamine (cmpd. 9 in FIG. 9)

17.16 g of solid ethylenediamine dilauramide 8 (40 mmoles) was added in portions to a stirred suspension of 4.60 g of $LiAlH_4$ (121 mmoles) in 250 mL anhydrous THF under $N_2$ with cooling (water bath). The mix was refluxed for 48 hrs then cooled and quenched by the careful addition of 35 mL of 4M NaOH. The white solid was filtered off and washed with THF then discarded. The filtrate was concentrated in vacuum to yield 15.72 g (99%) of a waxy white solid. 11.75 g of this material was recrystallized from 20 mL $H_2O$/150 mL ethanol to give 10.38 g of a white waxy solid 9 (88% recovery). $^1$H NMR (CDCl$_3$): 2.78 (4H, s), 2.63 (4H, t), 1.55 (4H, t), 1.28 (40H, m) 0.88 (6H, t). $^{13}$C NMR (CDCl$_3$): 49.78, 48.83, 31.90, 29.61–29 (overlapping peaks), 27.30, 22.67, 14.10.

EXAMPLE 14

Synthesis of a hydrophobic precursor to polymer B, N,N'-bis-dodecylethylenediamine bis-chloroacetamide (cmpd. 10, FIG. 9)

0.4 mL of Chloroacetyl chloride (5 mmoles) was added dropwise to a solution of 1.98 g of N,N'-bisdodecylethylenediamine (5 mmoles) in 100 mL of chloroform. After 30 min, 0.7 mL of triethylamine (5 mmoles) was added, followed by another 0.4 mL of chloroacetyl chloride. This procedure was repeated after another 30 min. The mixture was stirred overnight then washed with water, 4N HCl and finally by sat. aq. NaHCO$_3$. The solution was dried with MgSO$_4$ and concentrated in vacuum to yield 2.52 g (92%) of a thick straw-colored oil 10. This was used as is in the following procedure: $^1$H NMR (CDCl$_3$): 4.04 (4H, s), 3.80 (4H, s), 3.29 (4H, t), 1.6 (4H, t)1.23 (40H, m), 0.85 (6H, t).

EXAMPLE 15

Synthesis of a hydrophobic precursor to polymer B, N,N'-bisdodecylethylenediamine bis-cyanoacetamide (Cmpd. 11 in FIG. 9): A mixture of 2.26 g (4.1 mmoles) of N,N'-bisdodecylethylenediamine bis-chloroacetamide 10 and 0.5 g (10 mmoles) of powdered NaCN in 50 mL of DMSO was heated to 100° C. and held there for three days. The solution was cooled and poured into 600 mL of cold water. The aq solution was extracted with 300 & 100 mL ether. The combined extracts were washed well with water then dried over MgSO$_4$, filtered and concentrated in vacuum to give 1.85 g (85%) of a brown glassy solid. This was chromatographed on Silica Gel eluting with 40% ethyl acetate/Hexanes to yield 0.78 g (36%) of a brown glassy material 11. $^1$H NMR (CDCl$_3$): 3.51 (4H, s), 3.49 (4H, s), 3.24 (4H, t), 1.29 (40H, m), 0.88 (6H, t).

The same procedure was followed as in Examples 12–15 except using caproyl chloride to arrive at N,N'-biscaprylethylenediamine biscyanoacetamide.

EXAMPLE 16

Synthesis of polymer B (FIG. 5)

The synthesis of the polymer sample B (#1460-54) was accomplished by the step growth polymerization (Knoevenagel condensation) of bis-aldehyde monomer (cmpd. 3 in FIG. 8) with the α-cyano bis-amide monomer in FIG. 9. #1460-54: Into a 50 ml round bottom flask were placed 0.3114 g of bis(a-cyano-N-dodecyl-N-ethylene)acetamide, 0.2686 g of ester substituted bis aldehyde 3 in FIG. 4, 0.4 ml of piperdine and 25 ml of pyridine. The solution was heated to reflux for ten days. The system was cooled and 0.05 g of dimethylaminopyridine was added and the solution was reheated to reflux for an additional four days. The solution was then cooled, precipitated into hexane and dried. The solution was cooled, precipitated into methanol, dissolved in chloroform, filtered, and dried. By GPC and H$^1$ NMR, it is estimated from end-group analysis that the molecular weight was quite low (≈2000 g/mol.). The possibility of amide formation by piperdine reacting with the ester of the aldehyde was ruled out by the H$^1$ NMR which showed no amide formation.
[Note: The synthesis of #1460-54 was repeated (#1460-58) with essentially the same results (low molecular weight).]

EXAMPLE 17

Synthesis of polymer B' (not shown in FIG. 5)

The synthesis of the polymer sample B' (#1460-80) was accomplished by the step growth polymerization (Knoevenagel condensation) of bis-aldehyde monomer (cmpd. 7 in FIG. 8) with the α-cyano bis-amide monomer (Compd. 11 in FIG. 9). Into a 50 ml round bottom flask were placed 0.0826 g of hydroxy ethyl ethylene amino bis aldehyde (cmpd. 7 in FIG. 8), 0.0575 g of N,N-bis-dodecylamide, 15 ml of dry pyridine, and 2 ml of piperdine. After one week at reflux, the number average molecular weight was found to be about 5,000 from H$^1$ NMR end-group analysis. The polymer is soluble in pyridine and a pyridine-chloroform mixture (yellow orange solution) and films can be cast. In pure chloroform, the polymer solution is red and the polymer appears to slowly precipitate from solution.

EXAMPLE 18

Polymer Purification

Polymers A from Example 3 and B from Example 16 were purified by preparative-scale gel permeation chromatography (GPC) in chloroform solution (3.5 mL/min. flow rate) using Shodex H-2000 series columns (500 Å and 10,000 Å) with differential refractive index (DRI, Waters R403) and ultraviolet-visible (IIV/vis, Waters 484) detection. The columns were standardized using 1 mg/mL solutions of polystyrene standards to give a third-order polynomial calibration from 100 to 1,000,000 Daltons.

Samples being purified were injected (5 mL loop) in concentrations ranging from 1 to 10 mg/mL. Samples or fractions were collected as they eluted from the second detector (DRI) as a function of time. The calibration curve was used to predict the molecular weight of the polymer eluting at any particular time. This procedure allowed fractions of the desired molecular weight polymer to be isolated. These fractions were then re-injected to determine the number-average ($<M_n>$) and weight-average ($<M_w>$) molecular weights of each fraction. The results are summarized in Table I for polymer A. Solution-state, proton nuclear magnetic resonance spectroscopy (Bruker, 400 MHZ) was used to confirm the $<M_n>$ values of fractions based on end-group analysis. Polymers A and B were isolated from GPC fractions by evaporation of the chloroform and drying under reduced pressure (50 mTorr) at 100° C. in darkness for several hours. Polymer B appeared to be low molecular weight oligomers, $<M_n>\approx 2000$.

TABLE I

| Molecular Weight Characteristics of Polymer A Samples. | | | |
|---|---|---|---|
| Sample | $<M_n>$ | $<M_w>$ | $<M_w>/<M_n>$ |
| 1460-44-1 | 46,900 | 52,800 | 1.12 |
| 1460-44-3 | 12,500 | 14,500 | 1.16 |
| 1460-44-5 | 2100 | 2300 | 1.07 |

EXAMPLE 19

Substrate Preparation

Glass microscope slides were prepared for deposition as follows. Slides were washed with soap and water, rinsed with deionized water, treated with an ultrasonic conditioning in 1 molar aqueous sodium hydroxide, rinsed with deionized water, treated with ultrasonic conditioning in 1 molar aqueous hydrochloric acid, and rinsed with deionized water. This treatment produced slides with a hydrophilic surface that could be used immediately.

Hydrophobic glass was prepared as above but further treated by drying in air at 120° C. for about 30 minutes followed by conditioning in a refluxing nitrogen atmosphere of hexamethyldisilazane (HMDS) for about 30 minutes. These slides produced a water contact angle of about 100°

C. and were used immediately for multilayer film depositions.

EXAMPLE 20

Solution Preparation and Langmuir-Blodgett Film Deposition

Spreading solutions of polymer A (0.49 mg/mL) and polymer B (0.653 mg/mL) were prepared by dissolving 2.0 mg of #1460-44 (polymer A) in 6.0816 g (4.08 mL) of spectroscopy grade chloroform, and 2.5 mg of #1460-54 (polymer B) in 5.7044 g (3.83 mL) spectroscopy grade chloroform. These solutions were used to spread films on pure water at 23° C.

A dual-compartment Langmuir-Blodgett trough (Nima Model TKB 2410A) was used to prepare multilayer films as follows. The trough was cleaned with chloroform and filled with pure water (18 MΩ, Millipore Milli-Q system). The surface pressure sensors, barriers and dipper were calibrated before use and the surface was thoroughly cleaned by repeated compressions and sweeping.

The polymer A and B solutions were spread by dropping 80 μL of each onto the water in compartments A and B of the trough (about 500 cm², each compartment). The two films were allowed to dry for several minutes and then compressed at a rate of about 20 cm²/min. until a surface pressure of 20.0 mN/m was obtained. The compressed films were aged at 20 mN/m for about 20 min. to allow densification of the monolayers.

Figure 10:
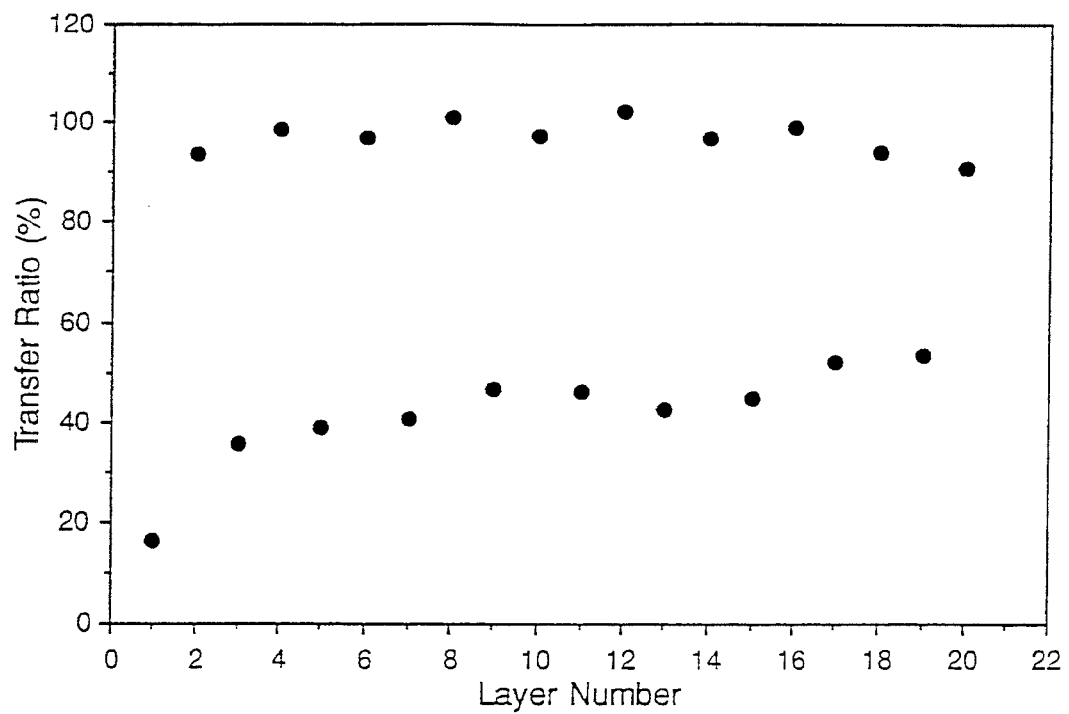
FIG. 10 is a graph of the transfer ratio of each layer of a multilayer NLO film, according to the invention, plotted as a function of the layer number.

The monolayer films were deposited onto the substrate through the use of a dipper mechanism which transported the substrate down through the interface in compartment A (polymer A) and up through the interface in compartment B (polymer B) at a rate of about 2 mm/min. The change in surface area of each compartment was monitored as the transfer of the film from the interface to the substrate was made at constant surface pressure. After each layer deposition, a transfer ratio was computed as the ratio of the change in area of the compartment to the area of the substrate. The ratio was then multiplied by 100% and plotted as a function of the layer number. An example of such a graph is shown in FIG. 10 for run #1440-39B (polymers A and B).

Quantitative transfer of a layer should yield a transfer ratio of 100% if the molecular orientation of the film is not changed by the transfer process. In FIG. 10, the downstroke (X-type) depositions (odd-numbered layers) were apparently less ideal than the upstroke (Z-type) depositions (even-numbered layers). The X-type depositions improved slightly with increasing layers and the Z-type depositions remained fairly uniform throughout the process.

EXAMPLE 21

Langmuir-Blodgett Film Characterization by Second Harmonic Generation

Langmuir-Blodgett AB multilayer films were stored in darkness at room temperature, because these films can photobleach under fluorescent room lighting conditions. Various types of characterizations were performed to assess the structure and quality of the deposited films.

Optical second harmonic generation (SHG) is a useful indicator of nonlinear optical behavior in thin films. The intensity of second-harmonic or frequency doubled light produced by a NLO film should be directly proportional to the thickness of the film squared. In the case of LB films, the thickness is determined by the thickness of a single monolayer (or bilayer) and the number of monolayers (or bilayers) deposited. Consequently, a useful method for checking the deposition of NLO LB films is to measure SHG production as a function of deposited layers. If the noncentrosymmetric orientation of the chromophoric polymer monolayers is preserved upon deposition, the theoretically predicted behavior should observed.

Figure 11:
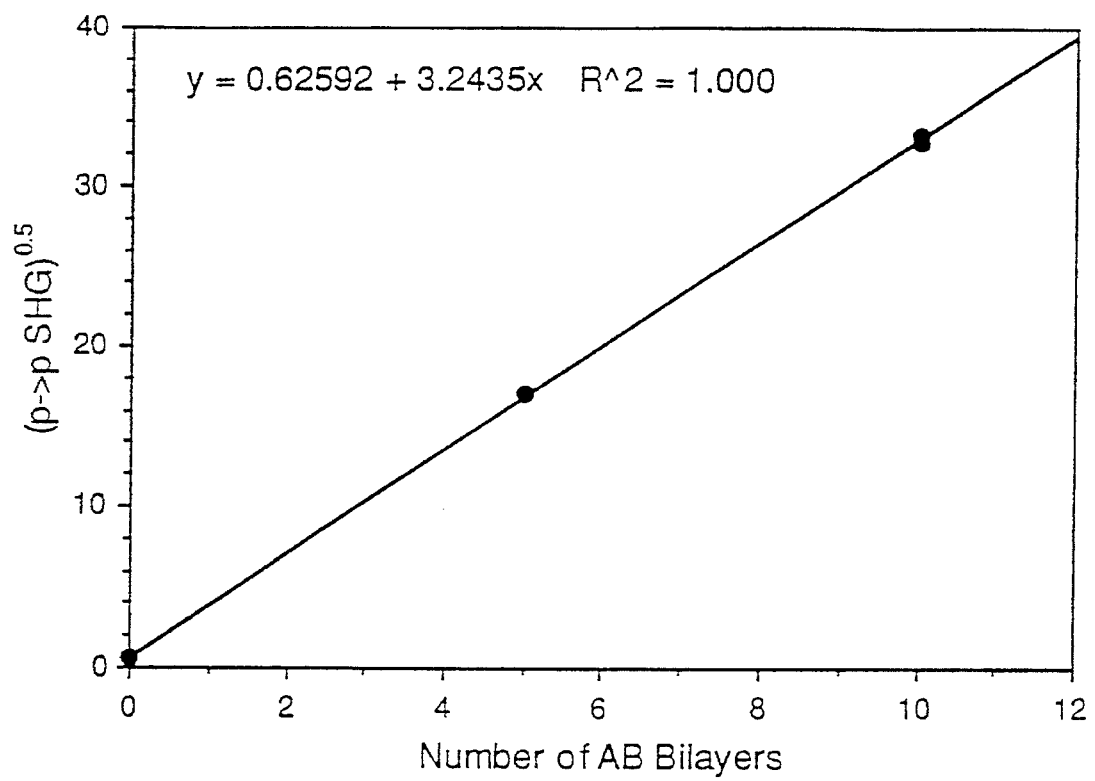
FIG. 11 is a graph of optical second-harmonic generation for three multilayer NLO films $(AB)_n$ of different thicknesses, plotted as a function of the number n of AB bilayers.

Three multilayer films of polymers A and B above were deposited on hydrophobic (HMDS-treated) glass microscope slides: one sample 5 bilayers thick (#1440-38A) and two samples each 10 bilayers thick (#1440-38C and #1440-39B). These three samples and a blank or clean slide (also HMDS-treated) were characterized by optical SHG and the results are show in FIG. 11.

These results show the predicted quadratic dependence of the SHG intensity on the thickness of the NLO films for at least the first twenty layers or ten bilayers of polymers A and B.

There are many modifications, additions, and changes which can be made to the specific embodiments of the invention described above, which would be obvious to one skilled in the art. For this reason, it is intended that the scope of the invention be limited only by the appended claims.

What is claimed and desired to be secured by Letters Patent of the United States is:

1. A multilayer polarized film, which comprises at least one bilayer of two monomolecular layers of water-insoluble, head-to-head, mainchain, amphophilic, chromophoric polymers, one monomolecular layer A being formed of a polymer A and the other monomolecular layer B being formed of a polymer B, polymers A and B independently having two or more sequences of bridged chromophore units having the formulas

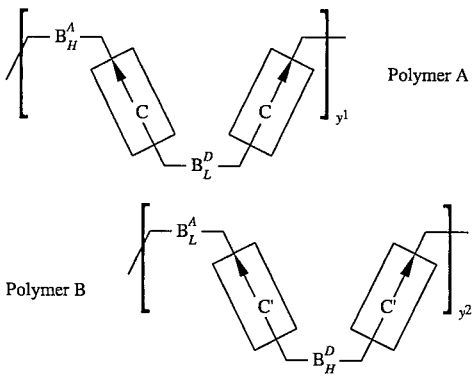

wherein:
C and C' are chromophores of polymers A and B, respectively, wherein each chromophore has an electron accepting end represented by an arrow head, an electron donating end represented by an arrow tail, and a rigid connecting group which contains delocalized H-electrons and which is connected between the electron accepting end and the electron donating end of the chromophore;

$B_L^A$ is a hydrophobic (lipophilic) bridging group extending between and attached to the electron accepting ends of two C' chromophores;

$B_L^D$ is a hydrophobic (lipophilic) bridging group, extending between and attached to the electron donating ends of two C chromophores;

$B_H^A$ is a hydrophilic bridging group extending between and attached to the electron accepting ends of two C chromophores;

$B_H^D$ is a hydrophilic bridging group, extending between and attached to the electron donating ends of two C' chromophores;

y1 and y2 are degrees of polymerization of polymers A and B, respectively, which independently range from a minimum value of 2 to a maximum value greater than 300.

2. A multilayer polarized film, as described in claim 1, wherein each hydrophobic electron-accepting bridging group $B_L^A$ is selected from one of the following units:

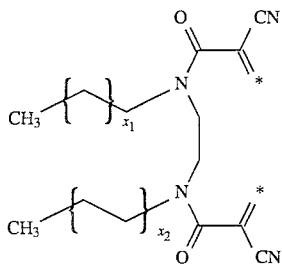

or

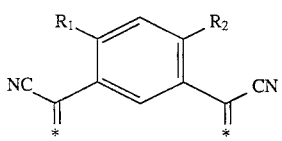

or

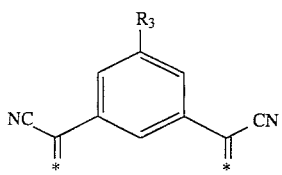

wherein:

* designates bonds of attachment between the bridging group and a chromophore;

$x_1$ is an integer from 3 through 22;

$x_2$ is an integer from 3 through 22;

$R_1$ and $R_2$ are independently chosen from H, $CH_3$, and $CF_3$; and

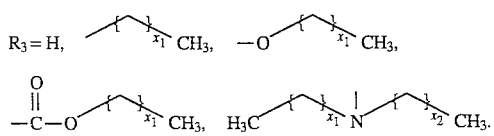

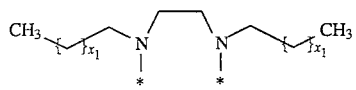

3. A multilayer polarized film, as described in claim 1, wherein each hydrophobic electron-donating bridging group $B_L^D$ is selected from one of the following units:

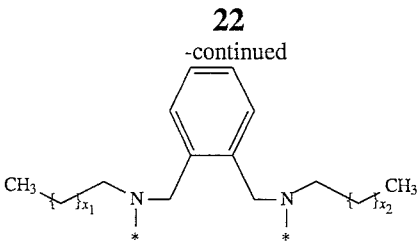

-continued

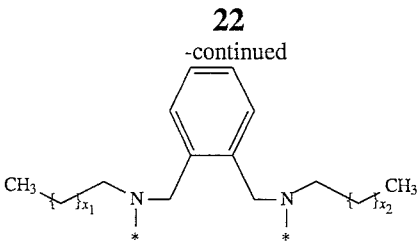

wherein:

* designates bonds of attachment between the bridging group and a chromophore;

$x_1$ is an integer from 3 to 22; and $x_2$ is an integer from 3 to 22.

4. A multilayer polarized film, as described in claim 1, wherein each hydrophilic electron-accepting bridging group $B_H^A$ is selected from one of the following units:

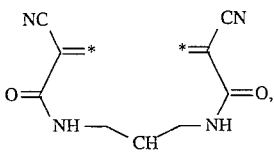

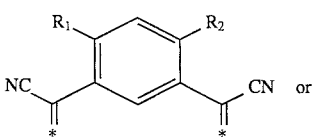 or

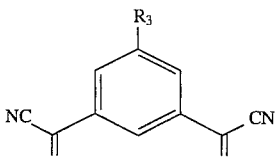

wherein:

* designates bonds of attachment between the bridging group and a chromophore;

$R_1$ and $R_2$ are independently chosen from $-NO_2$, $-CN$, and $-CONH_2$; and $R_3$ is chosen from $-OH$, $-NH_2$, $-CO_2H$, $-CO_2CH_3$, $-CONH_2$, $-OCH_3$, $-CN$, and $-NO_2$.

5. A multilayer polarized film, as described in claim 1, wherein each hydrophilic electron-donating bridging group $B_H^D$ is selected from one of the following units:

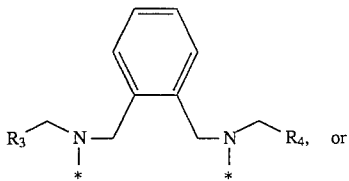 or

wherein:

* designates bonds of attachment between the bridging group and a chromophore; and $R_3$ and $R_4$ are one of —$CH_2OH$, —$CO_2CH_3$, —$CONH_2$, —$CON(CH_3)_2$, —$CH_2CO_2CH_3$, $CH_2CONH_2$, $CH_2CON(CH_3)_2$, —$CH_2NH_2$, and —$CH_2CO_2H$.

6. A multilayer polarized film, as described in claim 1, wherein at least one of (1) the rigid connecting group of the chromophore C and (2) the rigid connecting group of the chromophore C', is selected from the following groups, in which Z is S, O, or NH:

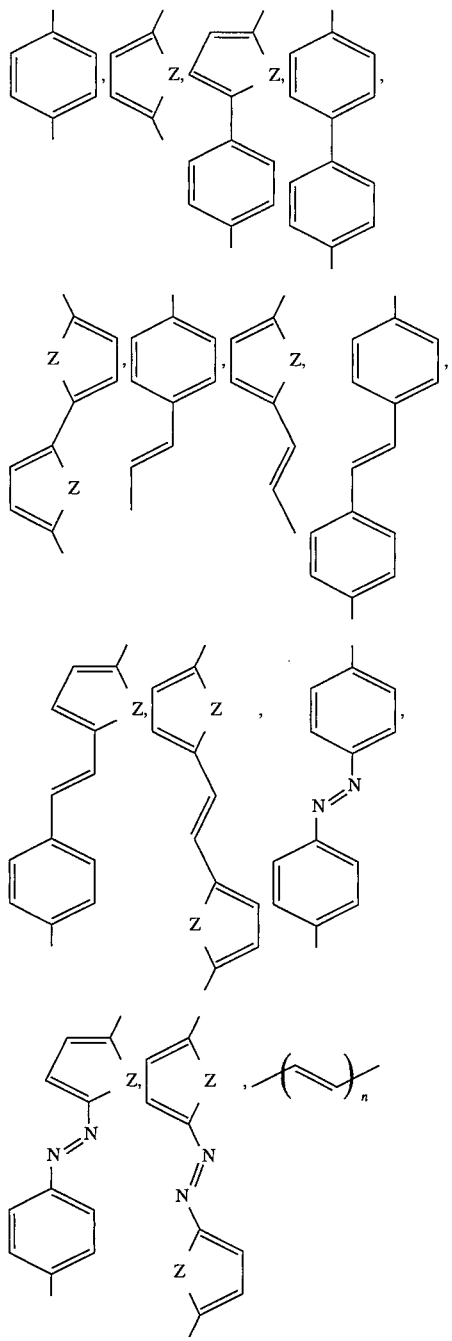

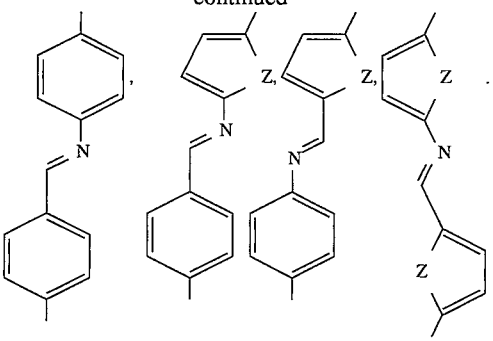

7. A multilayer polarized film, as described in claim 1, which further comprises a centrosymmetric gap layer or multilayer introduced at a selected position in the multilayer polarized film.

8. A multilayer polarized film, as described in claim 7, in which the centrosymmetric gap layer or multilayer comprises a fatty acid, a fatty acid salt, or a polymer.

9. A multilayer structure, which comprises a substrate and a multilayer polarized film disposed on the substrate, wherein said multilayer polarized film comprises at least one bilayer of two monomolecular layers of water-insoluble, head-to-head, mainchain, amphophilic, chromophoric polymers which are successively deposited on the substrate by the alternating, Y-type Langmuir-Blodgett process, one monomolecular layer A being formed of a polymer A and the other monomolecular layer B being formed of a polymer B, polymers A and B independently having two or more sequences of bridged chromophore units having the formulas

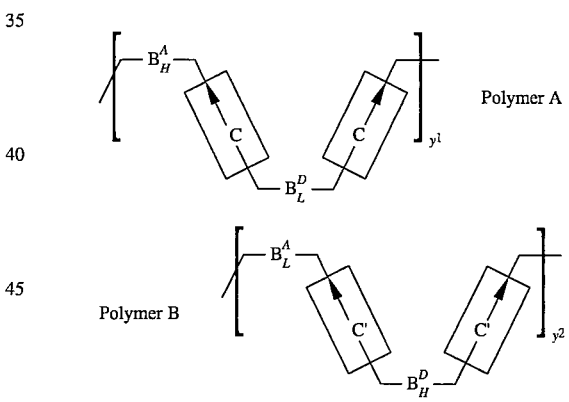

wherein:

C and C' are chromophores of polymers A and B, respectively, wherein each chromophore has an electron accepting end represented by an arrow head, an electron donating end represented by an arrow tail, and a rigid connecting group which contains delocalized n-electrons and which is connected between the electron accepting end and the electron donating end of the chromophore;

$B_L^A$ is a hydrophobic (lipophilic) bridging group, extending between and attached to the electron accepting ends of two C' chromophores;

$B_L^D$ is a hydrophobic (lipophilic) bridging group, extending between and attached to the electron donating ends of two C chromophores;

$B_H^A$ is a hydrophilic bridging group, extending between and attached to the electron accepting ends of two C' chromophores;

$B_H^D$ is a hydrophilic bridging group, extending between and attached to the electron donating ends of two C' chromophores;

y1 and y2 are degrees of polymerization of polymers A and B, respectively, which independently range from a minimum value of 2 to a maximum value greater than 300.

10. A multilayer structure, as described in claim 9, in which said monomolecular layers A and B are deposited on a solid substrate by the alternating, Y-type Langmuir-Blodgett process to form at least one bilayer, wherein the sense of the polarity may be controlled by the order of deposition to yield four different multilayer structures, represented by:

$$S_L(\rightarrow)(AB)_n$$

$$S_L(\leftarrow)(BA)_n$$

$$S_H(\leftarrow)(AB)_n$$

$$S_H(\rightarrow)(BA)_n$$

wherein:

$S_L$ is a hydrophobic (lipophilic) substrate;

$S_H$ is a hydrophilic substrate;

AB is a bilayer in which layer A is first deposited;

BA is a bilayer in which layer B is first deposited;

n is the number of bilayers;

($\rightarrow$) indicates a sense of polar order which is in a direction away from the substrate; and ($\leftarrow$) indicates that a sense of polar order which is in a direction toward the substrate.

11. A multilayer structure, as described in claim 9, wherein the sense of the polarity may be changed (i.e., an inversion of dipole direction) at any desired depth in the film by depositing two monomolecular layers of the same polymer A or B at the desired depth to thus reverse the order of deposition.

12. A multilayer structure, as described in claim 11, in which the sense of the polarity is changed once to yield one of the following structures:

$$S_L(\rightarrow)(AB)_{n1}(\leftarrow)(BA)_{n2}$$

$$S_L(\leftarrow)(BA)_{n1}(\rightarrow)(AB)_{n2}$$

$$S_H(\leftarrow)(AB)_{n1}(\rightarrow)(BA)_{n2}$$

$$S_H(\rightarrow)(BA)_{n1}(\leftarrow)(AB)_{n2}$$

wherein:

$S_L$ is a hydrophobic (lipophilic) substrate;

$S_H$ is a hydrophilic substrate;

AB is a bilayer in which layer A is first deposited;

BA is a bilayer in which layer B is first deposited;

n1 is the number of bilayers in the first group of bilayers to be deposited;

n2 is the number of bilayers in the second group of bilayers to be deposited;

($\rightarrow$) indicates a sense of polar order which is in a direction away from the substrate; and ($\leftarrow$) indicates that a sense of polar order which is in a direction toward the substrate.

13. A multilayer structure, as described in claim 11, in which the sense of the polarity is changed twice to yield one of the following structures:

$$S_L(\rightarrow)(AB)_{n1}(\leftarrow)(BA)_{n2}(\rightarrow)(AB)_{n3}$$

$$S_L(\leftarrow)(BA)_{n1}(\rightarrow)(AB)_{n2}(\leftarrow)(BA)_{n3}$$

$$S_H(\leftarrow)(AB)_{n1}(\rightarrow)(BA)_{n2}(\leftarrow)(AB)_{n3}$$

$$S_H(\rightarrow)(BA)_{n1}(\leftarrow)(AB)_{n2}(\rightarrow)(BA)_{n3}$$

wherein:

$S_L$ is a hydrophobic (lipophilic) substrate $S_H$ is a hydrophilic substrate

AB is a bilayer in which layer A is first deposited;

BA is a bilayer in which layer B is first deposited;

n1 is the number of bilayers in the first group of bilayers to be deposited;

n2 is the number of bilayers in the second group of bilayers to be deposited;

n3 is the number of bilayers in the third group of bilayers to be deposited;

($\rightarrow$) indicates a sense of polar order which is in a direction away from the substrate; and ($\leftarrow$) indicates that a sense of polar order which is in a direction toward the substrate.

14. A multilayer polarized film, which comprises at least one bilayer of two monomolecular layers of water-insoluble, head-to-head, mainchain, amphophilic, chromophoric polymers, one monomolecular layer A being formed of a polymer A and the other monomolecular layer B being formed of a polymer B, polymers A and B independently having two or more sequences of bridged chromophore units having the formulas

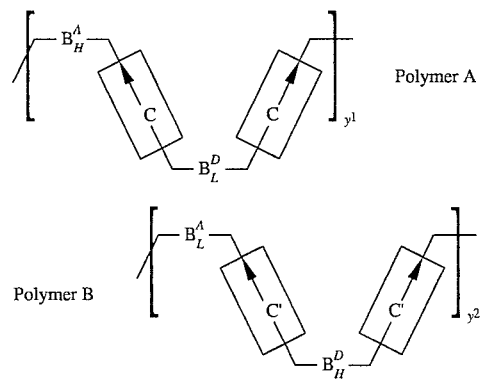

wherein:

C and C' are chromophores of polymers A and B, respectively, wherein each chromophore has an electron accepting end represented by an arrow head, an electron donating end represented by an arrow tail, and a rigid connecting group which contains delocalized n-electrons and which is connected between the electron accepting end and the electron donating end of the chromophore;

$B_L^A$ is a hydrophobic (lipophilic) bridging group extending between and attached to the electron accepting ends of two C' chromophores;

$B_L^D$ is a hydrophobic (lipophilic) bridging group, extending between and attached to the electron donating ends of two C chromophores;

$B_H^1$ is a hydrophilic bridging group, extending between and attached to the electron accepting ends of two C chromophores;

$B_H^D$ is a hydrophilic bridging group, extending between and attached to the electron donating ends of two C' chromophores;

y1 and y2 are degrees of polymerization of polymers A and B, respectively, which independently range from a minimum value of 2 to a maximum value greater than 300;

said multilayer polarized film having a noncentrosymmetric conformation attained through successive self-assembly of polymers A and B on a surface, said noncentrosymmetric conformation being evidenced by a second-order nonlinear optical property, a piezoelectric property or a pyroelectric property.

15. A multilayer polarized film, as described in claim 14, in which polymers A and B are successively deposited on a solid substrate by the alternating, Y-type Langmuir-Blodgett process.

* * * * *